United States Patent
Oteri et al.

(10) Patent No.: US 12,199,721 B2
(45) Date of Patent: Jan. 14, 2025

(54) UNIFIED FEEDBACK FOR OFDMA WLAN

(71) Applicant: InterDigital Patent Holdings, Inc., Wilmington, DE (US)

(72) Inventors: Oghenekome Oteri, San Diego, CA (US); Hanqing Lou, Syosset, NY (US); Rui Yang, Greenlawn, NY (US); Robert L. Olesen, Huntington, NY (US); Alphan Sahin, Westbury, NY (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/743,408

(22) PCT Filed: Jul. 1, 2016

(86) PCT No.: PCT/US2016/040719
§ 371 (c)(1),
(2) Date: Jan. 10, 2018

(87) PCT Pub. No.: WO2017/011211
PCT Pub. Date: Jan. 19, 2017

(65) Prior Publication Data
US 2018/0205442 A1    Jul. 19, 2018

Related U.S. Application Data

(60) Provisional application No. 62/251,482, filed on Nov. 5, 2015, provisional application No. 62/217,559, filed (Continued)

(51) Int. Cl.
*H04B 7/06* (2006.01)
*H04B 7/0417* (2017.01)
(Continued)

(52) U.S. Cl.
CPC ......... *H04B 7/0632* (2013.01); *H04B 7/0417* (2013.01); *H04W 24/10* (2013.01); *H04W 88/08* (2013.01)

(58) Field of Classification Search
None
See application file for complete search history.

(56) References Cited

U.S. PATENT DOCUMENTS 8,787,841 B2    7/2014 Ketchum et al.
8,908,600 B2    12/2014 Sampath et al.
(Continued)

FOREIGN PATENT DOCUMENTS

CA    2772468 A1    5/2012
CN    101479958 A    7/2009
(Continued)

OTHER PUBLICATIONS

3rd Generation Partnership Project (3GPP), 36.211, "3rd Generation Partnership Project; Technical Specification Group Radio Access Network; Evolved Universal Terrestrial Radio Access (E-UTRA); Physical channels and modulation (Release 12)" 3GPP TS 36.211 V12.4.0, Dec. 2014, 124 pages.
(Continued)

*Primary Examiner* — Steve R Young
(74) *Attorney, Agent, or Firm* — Flaster Greenberg P.C.

(57) ABSTRACT

An access point (AP) may transmit a null data packet announcement (NDPA) with an indication of a resource unit of a bandwidth that feedback is requested. The AP may transmit a null data packet (NDP) for measurement of a channel quality for a resource unit of a bandwidth. The AP may transmit, based on a response, another feedback request for resource units of the bandwidth.

19 Claims, 28 Drawing Sheets

Related U.S. Application Data on Sep. 11, 2015, provisional application No. 62/191,100, filed on Jul. 10, 2015.

(51) Int. Cl.
    *H04W 24/10*     (2009.01)
    *H04W 88/08*     (2009.01)

(56) References Cited

U.S. PATENT DOCUMENTS

| | | | |
|---|---|---|---|
| 8,923,219 | B2 | 12/2014 | Breit et al. |
| 9,019,983 | B2 | 4/2015 | Maeda et al. |
| 9,107,242 | B2 | 8/2015 | Sohn et al. |
| 9,326,190 | B2 | 4/2016 | Haghighat et al. |
| 9,585,165 | B2 | 2/2017 | Seok |
| 9,680,538 | B2 | 6/2017 | Xia et al. |
| 9,887,821 | B2 | 2/2018 | Seok |
| 10,375,682 | B2 | 8/2019 | Cheong et al. |
| 10,826,588 | B2 * | 11/2020 | Chun .............. H04L 1/0027 |
| 2007/0149249 | A1 | 6/2007 | Chen et al. |
| 2007/0298742 | A1 * | 12/2007 | Ketchum ........... H04B 7/0617 455/186.1 |
| 2008/0219219 | A1 | 9/2008 | Sartori et al. |
| 2010/0046451 | A1 | 2/2010 | Tada et al. |
| 2010/0202372 | A1 | 8/2010 | Chun et al. |
| 2011/0170631 | A1 | 7/2011 | Kim et al. |
| 2011/0299480 | A1 | 12/2011 | Breit et al. |
| 2012/0051246 | A1 | 3/2012 | Zhang et al. |
| 2012/0063439 | A1 | 3/2012 | Seok |
| 2012/0250543 | A1 * | 10/2012 | Abraham ........... H04B 7/0636 370/252 |
| 2012/0307757 | A1 | 12/2012 | Edler Von Elbwart et al. |
| 2013/0107916 | A1 * | 5/2013 | Liu .................. H04B 7/0452 375/219 |
| 2013/0223427 | A1 * | 8/2013 | Sohn, III .......... H04L 5/0048 370/338 |
| 2013/0235836 | A1 | 9/2013 | Roh et al. |
| 2013/0294397 | A1 | 11/2013 | Lee et al. |
| 2013/0294533 | A1 * | 11/2013 | Kim .................. H04B 7/0626 375/260 |
| 2014/0003269 | A1 | 1/2014 | Golitschek et al. |
| 2014/0044069 | A1 | 2/2014 | Bao et al. |
| 2014/0301240 | A1 * | 10/2014 | Park .................. H04B 7/0658 370/253 |
| 2015/0063128 | A1 * | 3/2015 | Garikipati .......... H04B 7/0417 370/252 |
| 2015/0215022 | A1 | 7/2015 | Nagata et al. |
| 2015/0296493 | A1 | 10/2015 | Wengerter et al. |
| 2015/0341933 | A1 | 11/2015 | Aboul-Magd et al. |
| 2016/0020888 | A1 | 1/2016 | Kwon et al. |
| 2016/0165607 | A1 * | 6/2016 | Hedayat ............ H04W 24/00 370/338 |
| 2016/0204960 | A1 * | 7/2016 | Yu .................... H04L 25/0224 370/338 |
| 2016/0254884 | A1 * | 9/2016 | Hedayat ............. H04B 7/063 370/329 |
| 2016/0261327 | A1 * | 9/2016 | Merlin .............. H04W 72/0413 |
| 2016/0278081 | A1 * | 9/2016 | Chun .............. H04W 72/0446 |
| 2016/0295513 | A1 * | 10/2016 | Moon ................. H04L 1/00 |
| 2016/0295581 | A1 * | 10/2016 | Ghosh .............. H04W 72/0446 |
| 2016/0301452 | A1 * | 10/2016 | Kwon ................ H04B 7/0634 |
| 2016/0380730 | A1 * | 12/2016 | Ghosh ............... H04L 25/0224 370/329 |
| 2017/0033898 | A1 * | 2/2017 | Chun ................. H04B 7/0417 |
| 2017/0310424 | A1 | 10/2017 | Chun et al. |
| 2018/0042029 | A1 * | 2/2018 | Ghosh ............... H04B 17/00 |

FOREIGN PATENT DOCUMENTS

| | | |
|---|---|---|
| CN | 101640656 A | 2/2010 |
| CN | 102036394 A | 4/2011 |
| CN | 102549992 A | 7/2012 |
| CN | 102783105 A | 11/2012 |
| CN | 102804637 A | 11/2012 |
| CN | 102812766 A | 12/2012 |
| CN | 103202085 A | 7/2013 |
| CN | 103380586 A | 10/2013 |
| CN | 104320228 A | 1/2015 |
| CN | 104350799 A | 2/2015 |
| CN | 104380787 A | 2/2015 |
| CN | 101352089 B | 4/2015 |
| JP | 4698734 B | 6/2011 |
| WO | WO 2011/035204 A2 | 3/2011 |
| WO | 2012011658 A2 | 1/2012 |
| WO | 2012067393 A1 | 5/2012 |
| WO | 2015/195050 A1 | 12/2015 |
| WO | WO 2016/053024 A1 | 4/2016 |

OTHER PUBLICATIONS

3rd Generation Partnership Project (3GPP), R1-101683, "Way Forward for Rel-10 Feedback Framework", Ericsson, Huawei, Alcatel-Lucent, Alcatel-Lucent Shanghai Bell, LG Electronics, Marvell, Nokia, Nokia Siemens Networks, NTT DoCoMo, Panasonic, Philips, Qualcomm Inc., Research In Motion, Samsung, ST-Ericsson, Texas Instruments, ZTE, Feb. 2010, 2 pages.
Aboul-Magd, Osama, "802.11 HEWSG Proposed PAR", IEEE 802.11-14/0165r1, IEEE P802.11 Wireless LANs, Mar. 2014, 6 pages.
Aboul-Magd, Osama, "IEEE 802.11 HEW SG Proposed CSD", IEEE 802.11-14/0169r1, IEEE P802.11 Wireless LANs, Mar. 2014, 6 pages.
Azizi et al., "OFDMA Numerology and Structure", IEEE 802.11-15/0330r5, May 13, 2015, 50 pages.
Chen et al., "MAC and PHY Proposal for 802.11af", IEEE 802.11-10/0258r0, Mar. 2010, 23 pages.
Andrews et al., "Fundamentals of WiMAX, Understanding Broadband Wireless Networking", Pearson Education, Inc., Feb. 2007, 61 pages.
Fano, Robert M., "The Transmission of Information", Technical Report No. 65, Research Laboratory of Electronics at MIT, Mar. 17, 1949, 37 pages.
Halasz, Dave, "Sub 1 GHz license-exempt PAR and 5C", IEEE 802.11-10/0001r7, IEEE P802.11 Wireless LANs, Jul. 2010, 8 pages.
Huffman, David A., "A Method for the Construction of Minimum-Redundancy Codes", Proceedings of the IRE, vol. 40, No. 9, Sep. 1952, pp. 1098-1101.
IEEE, "Part 11: Wireless LAN Medium Access Control (MAC) and Physical Layer (PHY) Specifications—Amendment 5: Enhancements for Very High Throughput for Operation in Bands below 6 GHz", IEEE P802.11ac™/D1.0, May 2011, 263 pages.
IEEE, "Part 11: Wireless LAN Medium Access Control (MAC) and Physical Layer (PHY) Specifications", IEEE Std 802.11™-2012, Mar. 29, 2012, 2793 pages.
Josiam et al., "Analysis on Multiplexing Schemes Exploiting Frequency Selectivity", IEEE 11-10/0858r1, Jul. 2014, 18 pages.
Oteri et al., "Frequency Selective Scheduling (FSS) for TGax OFDMA", IEEE 802.11-15/568r2, May 11, 2015, 21 pages.
Park, Minyoung, "Proposed Specification Framework for TGah", IEEE 802.11-11/1137r6, IEEE P802.11 Wireless LANs, Mar. 2012, 13 pages.
Perahia et al., "HEW Usage Scenarios and Applications", IEEE 802.11-13/0514r0, May 2013, 23 pages.
Porat et al., "Improved MU-MIMO Performance for Future 802.11 Systems Using Differential Feedback", Broadcom Corp., Information Theory and Applications Workshop (ITA), Feb. 2013, 5 pages.
Shannon, C., E., "A Mathematical Theory of Communication", The Bell System Technical Journal, vol. 27, No. 3, Jul. 1948, 55 pages.
Sharetechnote, "LTE Quick Reference", CQI/PMI Feedback Type—Details of Aperiodic Report, Available at http://www.sharetechnote.com/html/Handbook_LTE_CQI_PMI_FeedbackType.html, retrieved on Jan. 19, 2018, 4 pages.
Stacey, Robert, "Specification Framework for TGax", IEEE 802.11-15/0132r2, IEEE P802.11 Wireless LANs, Jan. 2015, 3 pages.
Tayamon et al., "Impact of Number of Sub-Channels in OFDMA", IEEE 802.11-15/0383r0, Mar. 2015, 21 pages.

(56) References Cited

OTHER PUBLICATIONS

Wong et al., "Proposed TGah Draft Amendment", IEEE 802.11-13/0500r1, IEEE P802.11 Wireless LANs, May 2013, 330 pages.
Wu et al., "OFDMA Performance Analysis", IEEE 802.11-14/1227r2, Sep. 2014, 11 pages.
Aboul-Magd, "802.11 HEW SG Proposed PAR," IEEE 802.11-14/0165r0 (Jan. 22, 2014).
Aboul-Magd, "IEEE 802.11 HEW SG Proposed CSD," IEEE 802.11-14/0169r0 (Jan. 22, 2014).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D0.2 (Jun. 2016).
Ghosh et al., "DL Sounding Sequence with UL MU Feedback," IEEE 802.11-15/1103r0 (Sep. 14, 2015).
Halasz, "Sub 1 GHz license-exempt PAR and 5C," IEEE P802.11 Wireless LANs, IEEE 802.11-10/0001r13 (Jul. 2010).
IEEE P802.11ah/D5.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
Madhavan et al., "Reducing Channel Sounding Protocol Overhead for 11ax," IEEE 802.11-15/1097r1 (Sep. 14, 2015).
Oteri et al., "Further Analysis of Feedback and Frequency Selective Scheduling (FSS) for TGax OFDMA," IEEE 802.11-15/0818r1 (Jul. 12, 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.6.0 (Jun. 2015).
Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).
Third Generation Partnership Project, "Technical Technical Specification Group Radio Access Network; Evolved Universal Terrestrial Radio Access (E-UTRA); Physical channels and modulation (Release 13)," 3GPP TS 36.211 V13.2.0 (Jun. 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
3rd Generation Partnership Project, "CoMP Feedback based on Multiple CSI-RS Resources", Alcatel-Lucent Shanghai Bell, Alcatel-Lucent, R1-114048, Nov. 14-18, 201, 6 pages.

\* cited by examiner

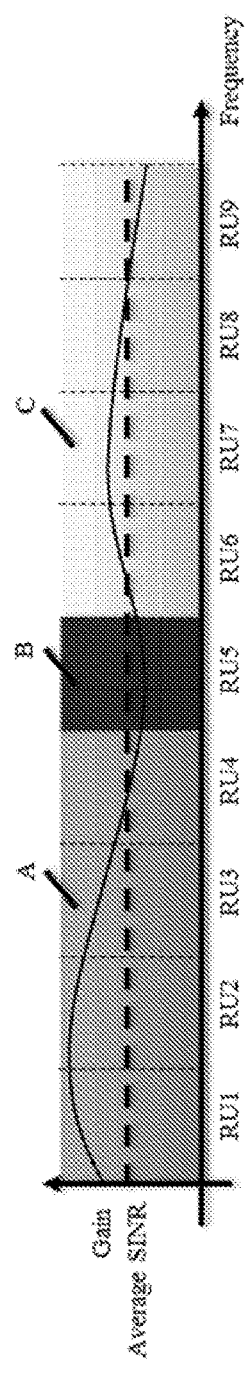

FEEDBACK GRANULARITY (FG):

| Case 6 (37 RUs) |
| Case 5 (21 RUs) |
| Case 4 (13 RUs) |
| Case 3 (5 RUs) |
| Case 2 (3 RUs) |
| Case 1 (No OFDMA) |

RU GRANULARITY (RG):

| Case 6 (37 RUs) |
| Case 5 (21 RUs) |
| Case 4 (13 RUs) |
| Case 3 (5 RUs) |
| Case 2 (3 RUs) |
| Case 1 (No OFDMA) |

80 MHz FG/RG

FIG. 9C

| RU label | Frequency |
|---|---|
| 1 | 56 |
| 2 | 46 |
| 3 | 1 |
| 4 | 33 |
| 5 | 16 |
| 6 | 79 |
| 7 | 31 |
| 8 | 52 |
| 9 | 16 |
| 10 | 4 |
| 11 | 24 |
| 12 | 16 |
| 13 | 19 |
| 14 | 2 |
| 15 | 3 |

| RU label | Frequency | RU label | | | | | | | | | | | | | |
|---|---|---|---|---|---|---|---|---|---|---|---|---|---|---|---|
| 6 | 79 | 0 | 0 | 0 | | | | | | | | | | | |
| 1 | 56 | 0 | 0 | 1 | 0 | | | | | | | | | | |
| 8 | 52 | 0 | 1 | 1 | 1 | | | | | | | | | | |
| 2 | 46 | 1 | 1 | 0 | 0 | | | | | | | | | | |
| 4 | 33 | 1 | 1 | 1 | 1 | 0 | | | | | | | | | |
| 7 | 31 | 1 | 1 | 1 | 0 | 1 | | | | | | | | | |
| 11 | 24 | 1 | 1 | 1 | 1 | 0 | 0 | | | | | | | | |
| 13 | 19 | 1 | 1 | 1 | 0 | 0 | 1 | 0 | | | | | | | |
| 5 | 16 | 1 | 1 | 1 | 0 | 1 | 1 | 1 | | | | | | | |
| 9 | 16 | 1 | 1 | 1 | 1 | 0 | 1 | 0 | 0 | | | | | | |
| 12 | 16 | 1 | 1 | 1 | 1 | 1 | 1 | 1 | 1 | 0 | | | | | |
| 10 | 4 | 1 | 1 | 1 | 1 | 1 | 1 | 1 | 1 | 1 | | | | | |
| 15 | 3 | 1 | 1 | 1 | 1 | 1 | 1 | 1 | 1 | 1 | 1 | | | | |
| 14 | 2 | 1 | 1 | 1 | 1 | 1 | 1 | 1 | 1 | 1 | 1 | 0 | | | |
| 3 | 1 | 1 | 1 | 1 | 1 | 1 | 1 | 1 | 1 | 1 | 1 | 1 | 1 | 0 | |

FIG. 15

| RU label | Frequency |
|---|---|
| 1 | 56 |
| 2 | 46 |
| 3 | 1 |
| 4 | 33 |
| 5 | 16 |
| 6 | 79 |
| 7 | 31 |
| 8 | 52 |
| 9 | 16 |
| 10 | 4 |
| 11 | 24 |
| 12 | 16 |
| 13 | 19 |
| 14 | 2 |
| 15 | 3 |
| 16 | 0 |

| RU label | | | | |
|---|---|---|---|---|
| 6 | 79 | 0 | 0 | 0 |
| 1 | 56 | 0 | 0 | 1 |
| 8 | 52 | 0 | 1 | 0 |
| 2 | 46 | 0 | 1 | 1 |
| 4 | 33 | 1 | 0 | 0 |
| 7 | 31 | 1 | 0 | 1 |
| 11 | 24 | 1 | 1 | 0 |
| 13 | 19 | 1 | 1 | 1 |
| 5 | 16 | | | |
| 9 | 16 | | | |
| 12 | 16 | | | |
| 10 | 4 | | | |
| 15 | 3 | | | |
| 14 | 2 | | | |
| 3 | 1 | | | |
| 16 | 0 | | | |

|  | Typical Rus | DC RU | Total RU | Total per user transmission | Overhead Savings |
|---|---|---|---|---|---|
| SU, 2x1, 26 tone RU (Bytes) | 8 | 1 | 9 | 44.00 | 60.00% |
| SU, 4x1, 26 tone RU (Bytes) | 8 | 1 | 9 | 59.00 | 77.13% |
| SU, 8x1, 26 tone RU (Bytes) | 8 | 1 | 9 | 89.00 | 83.91% |
| SU, 8x2, 26 tone RU (Bytes) | 8 | 1 | 9 | 131.00 | 86.34% |
| SU, 8x4, 26 tone RU (Bytes) | 8 | 1 | 9 | 204.00 | 87.73% |
|  |  |  |  |  |  |
| SU, 2x1, 52 tone RU (Bytes) | 4 | 1 | 5 | 49.60 | 54.91% |
| SU, 4x1, 52 tone RU (Bytes) | 4 | 1 | 5 | 76.60 | 70.31% |
| SU, 8x1, 52 tone RU (Bytes) | 4 | 1 | 5 | 130.60 | 76.38% |
| SU, 8x2, 52 tone RU (Bytes) | 4 | 1 | 5 | 206.20 | 78.50% |
| SU, 8x4 52 tone RU (Bytes) | 4 | 1 | 5 | 336.00 | 79.78% |
|  |  |  |  |  |  |
| SU, 2x1, 106 tone RU (Bytes) | 2 | 1 | 3 | 60.67 | 44.85% |
| SU, 4x1, 106 tone RU (Bytes) | 2 | 1 | 3 | 109.00 | 57.75% |
| SU, 8x1, 106 tone RU (Bytes) | 2 | 1 | 3 | 205.67 | 62.81% |
| SU, 8x2, 106 tone RU (Bytes) | 2 | 1 | 3 | 339.67 | 64.58% |
| SU, 8x4, 106 tone RU (Bytes) | 2 | 1 | 3 | 570.67 | 65.66% |
|  |  |  |  |  |  |
| SU, 2x1, 242 tone RU (Bytes) | 1 | 0 | 1 | 110.00 | 0.00% |
| SU, 4x1, 242 tone RU (Bytes) | 1 | 0 | 1 | 258.00 | 0.00% |
| SU, 8x1, 242 tone RU (Bytes) | 1 | 0 | 1 | 553.00 | 0.00% |
| SU, 8x2, 242 tone RU (Bytes) | 1 | 0 | 1 | 959.00 | 0.00% |
| SU, 8x4, 242 tone RU (Bytes) | 1 | 0 | 1 | 1662.00 | 0.00% |

FIG. 31

UNIFIED FEEDBACK FOR OFDMA WLAN

CROSS-REFERENCE TO RELATED APPLICATIONS

This application is the National Stage Entry under 35 U.S.C. § 371 Patent Cooperation Treaty Application No. PCT/US2016/040719, filed Jul. 1, 2016, which claims the benefit of U.S. Provisional Application Ser. No. 62/191,100 filed Jul. 10, 2015; U.S. Provisional Application Ser. No. 62/217,559 filed Sep. 11, 2015; and U.S. Provisional Application Ser. No. 62/251,482 filed Nov. 5, 2015, the contents of which are incorporated by reference herein and this application claims benefit of the filing date of these priority applications.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs.

SUMMARY

Systems, methods, and instrumentalities are disclosed for unified feedback for Orthogonal Frequency-Division Multiple Access (OFDMA) in a Wireless Local Area Network (WLAN). Unified feedback may be provided by per-RU-based Modulation and Coding Scheme (MCS) feedback, per-RU-based Channel State Information (CSI) feedback and/or feedback with symmetric RU allocation. RU-based MCS feedback may comprise, for example, RU-Based feedback with RU feedback compression using signal-to-noise ratio (SNR) deviation reports and/or RU labeling compression using source coding or hierarchical RU labeling (e.g., an RU Tree). RU-based CSI feedback may, for example, be based on indications of RU-based CSI feedback capability, an RU feedback mode, multi-stage RU-based feedback, and/or RU feedback granularity.

The method may include a method of resource feedback with an access point in a wireless local area network (WLAN). The method may include sending communications in the WLAN from the access point to a plurality of stations using one of orthogonal frequency-division multiple access (OFDMA) or multiple-input, multiple-output (MIMO) signaling; sending, in a null data packet announcement (NDPA) frame, from the access point, to each of the plurality of stations, a resource unit channel quality feedback request for at least one resource unit within a first bandwidth; sending, a null data packet (NDP), from the access point to each of the plurality of stations to measure and provide a channel quality for the at least one resource unit within the first bandwidth sent to each of the plurality of stations; receiving, at the access point from at least one of the plurality of stations, a resource unit channel quality feedback response comprising an indication of the channel quality for the resource unit within the first bandwidth for the at least one of the plurality of stations; and/or either scheduling at the access point at least one allocated resource unit for the at least one of the plurality of stations to send a data transmission to the access point based on the feedback response or sending a request to the at least one of the plurality of stations to send channel information based on the feedback response.

The indication of the channel quality may include at least one of a signal to noise ratio (SNR), a signal to interference noise ratio (SINR), or modulation and coding (MCS) feedback. The first bandwidth may be less than a transmission bandwidth between the access point and the plurality of stations. The access point may send a null data packet announcement (NDPA) frame to the plurality of stations that includes at least one of a feedback bandwidth, a grouping, a noise criterion index, a signal to noise ratio index, and the feedback type. The access point may schedule the at least one of the plurality of stations to send feedback upon receipt of a feedback request, when polled by the access point, in a cascaded manner, or at a time provided by the access point. Sending the request to at least one of the plurality of stations to send channel information based on the feedback response may include sending the request in the first bandwidth or a second bandwidth that is a subset of the first bandwidth.

The channel information may include channel state information or explicit compressed channel state information. The channel quality may include an SNR, channel state information, a channel quality indicator, a precoding matrix indicator, or a rank indicator.

The NDPA frame may include channel feedback parameters. The channel feedback parameters may be determined by the access point or the plurality of stations.

An access point in a wireless local area network (WLAN) may include a processor configured with executable instructions to send communications in the WLAN from the access point to a plurality of stations using one of orthogonal frequency-division multiple access (OFDMA) or multiple-input, multiple-output (MIMO) signaling; send, in a null data packet announcement (NDPA) frame, from the access point, to each of the plurality of stations, a resource unit channel quality feedback request for at least one resource unit within a first bandwidth; send, a null data packet (NDP), from the access point to each of the plurality of stations to measure and provide a channel quality for the at least one resource unit within the first bandwidth sent to each of the plurality of stations; receive, at the access point from at least one of the plurality of stations, a resource unit channel quality feedback response comprising an indication of the channel quality for the resource unit within the first bandwidth for the at least one of the plurality of stations; and/or either schedule at the access point at least one allocated resource unit for the at least one of the plurality of stations to send a data transmission to the access point based on the feedback response or send a request to the at least one of the plurality of stations to send channel information based on the feedback response.

The access point processor may include executable instructions to send a null data packet announcement (NDPA) frame to the plurality of stations that includes at least one of a feedback bandwidth, a grouping, a noise criterion index, a signal to noise ratio index, and the feedback type; schedule a station to send feedback upon receipt of a feedback request, when polled by the access point, in a cascaded manner, or at a time provided by the access point; and/or send a request to at least one of the plurality of stations to send channel information based on the feedback response in the first bandwidth or a second bandwidth that is a subset of the first bandwidth. The access point processor may be programmed with instructions to perform any of the access point descriptions described herein.

BRIEF DESCRIPTION OF THE DRAWINGS

FIG. 9 is an example of feedback granularity at a receiver.

FIG. 9A, 9B, or 9C show examples relating to feedback and/or granularity.

FIG. 15 is an example of entropy encoding.

FIG. 18 is an example of hierarchical feedback with a layer restriction.

FIG. 19 is an example of hierarchical feedback without a layer restriction.

FIG. 31 is an example of feedback savings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
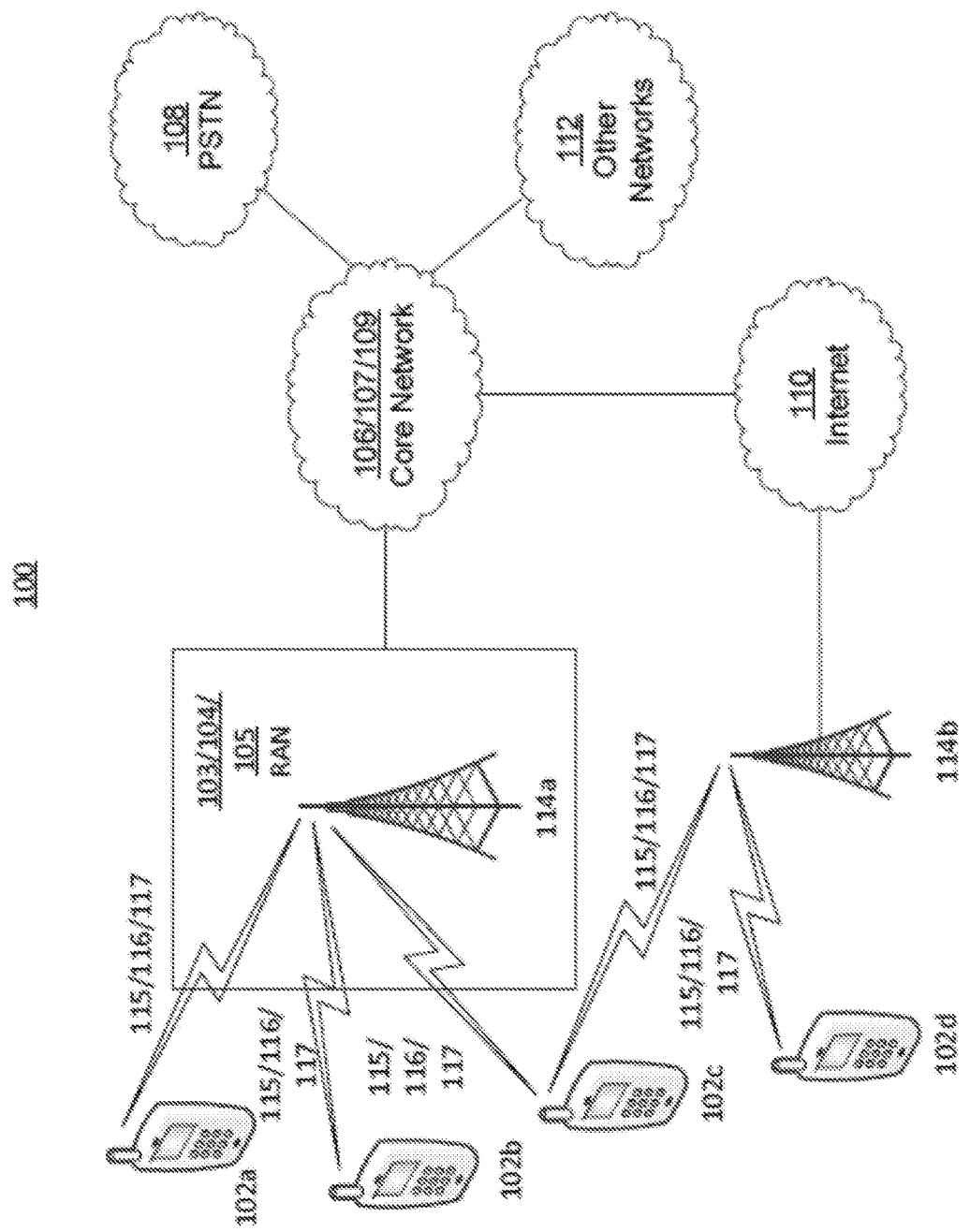
FIG. 1A is a diagram of an example communications system in which one or more disclosed features may be implemented.

FIG. 1A is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
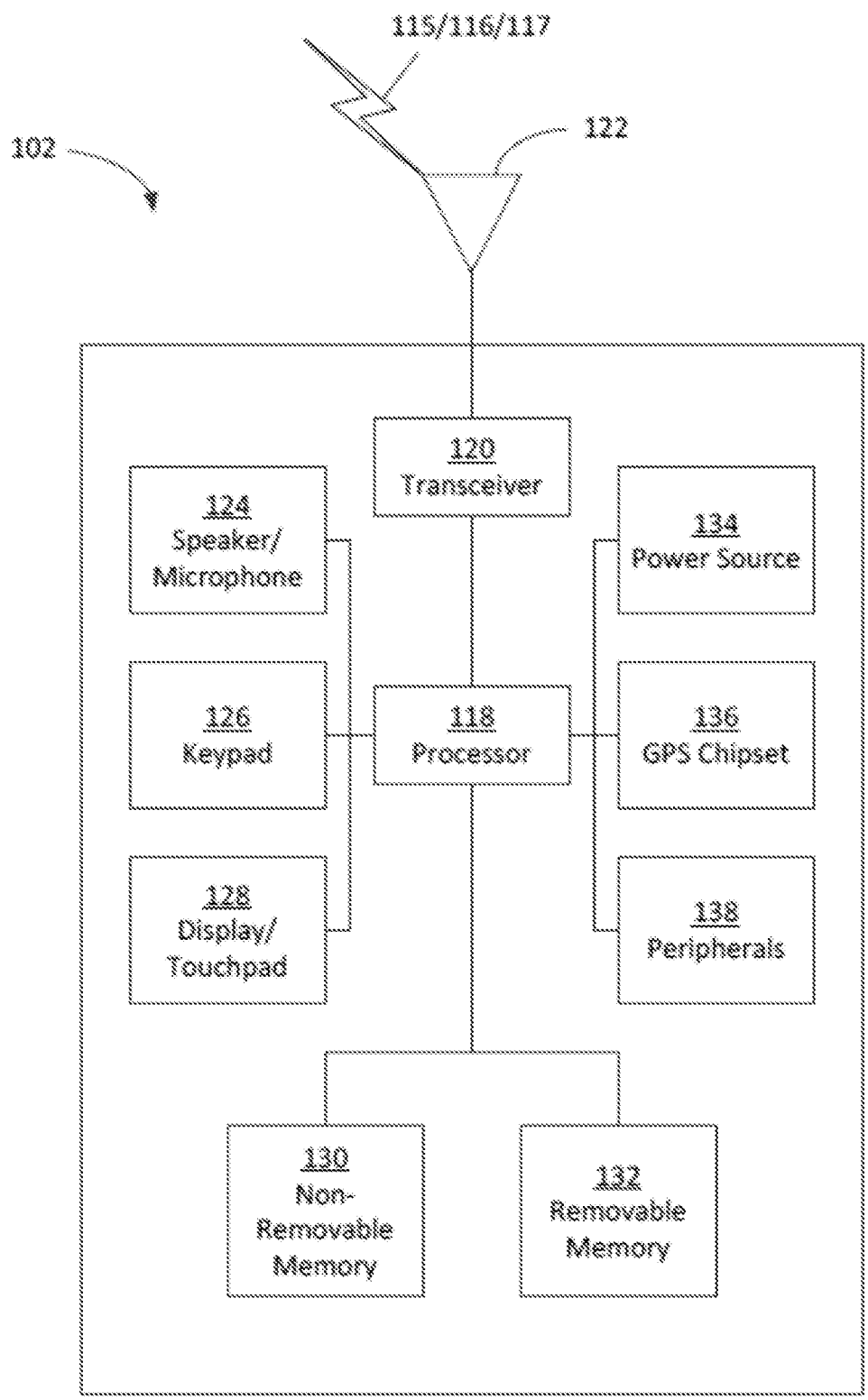
FIG. 1B depicts an exemplary wireless transmit/receive unit, WTRU.

FIG. 1B depicts an exemplary wireless transmit/receive unit, WTRU 102. WTRU 102 may be used in one or more of the communications systems described herein. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
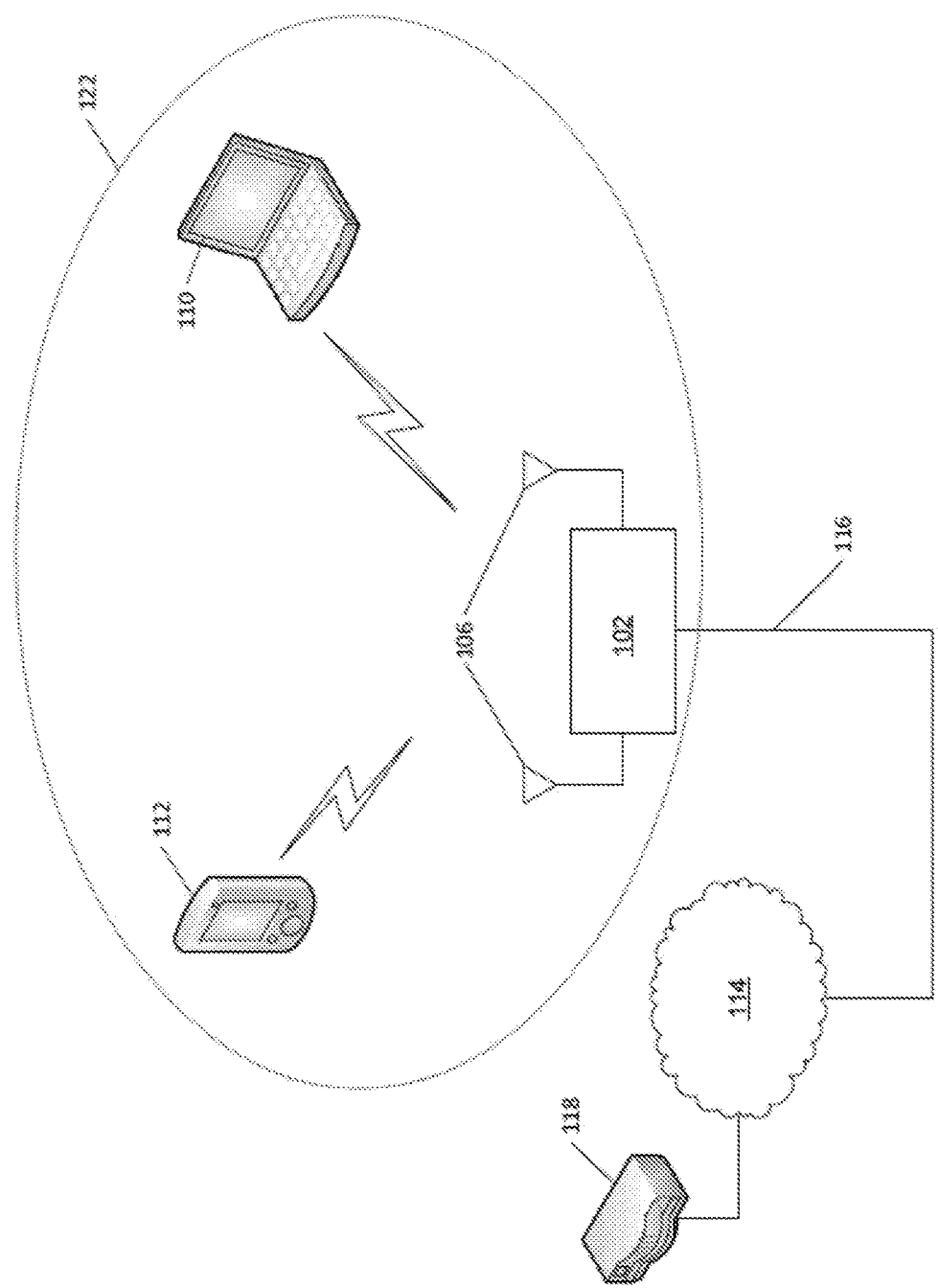
FIG. 1C illustrates exemplary wireless local area network (WLAN) devices.

FIG. 1C illustrates exemplary wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1C), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1C. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Systems, methods, and instrumentalities are disclosed for unified feedback for OFDMA WLAN. Unified feedback may be provided by per-RU-based MCS feedback, per-RU-based CSI feedback and/or feedback with symmetric RU allocation.

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more stations (STAs) may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. Traffic originating from STAs to destinations outside a BSS may be sent to an AP, which may deliver the traffic to respective destinations. Traffic between STAs within a BSS may be sent through an AP, e.g., from a source STA to the AP and from the AP to the destination STA. Traffic between STAs within a BSS may be peer-to-peer traffic. Peer-to-peer traffic may be sent directly between the source and destination STAs, for example, with a direct link setup (DLS) using an 802.11e DLS or an 802.11z tunneled DLS (TDLS). A WLAN in Independent BSS (IBSS) mode may not have an AP, and, STAs may communicate directly with each other. An IBSS mode of communication may be referred to as an "ad-hoc" mode of communication.

An AP may transmit a beacon on a fixed channel (e.g. a primary channel), for example, in an 802.11ac infrastructure mode of operation. A channel may be, for example, 20 MHz wide. A channel may be an operating channel of a BSS. A channel may be used by STAs, for example, to establish a connection with an AP. A channel access mechanism in an 802.11 system is Carrier Sense Multiple Access with Collision Avoidance (CSMA/CA). An STA, including an AP, may sense a primary channel, for example, in a CSMA/CA mode of operation. An STA may back off, for example, when a channel is detected to be busy so that only one STA may transmit at a time in a given BSS.

High Throughput (HT) STAs may use, for example, a 40 MHz wide channel for communication, e.g., in 802.11n. A primary 20 MHz channel may be combined with an adjacent 20 MHz channel to form a 40 MHz wide contiguous channel.

Very High Throughput (VHT) STAs may support, for example, 20 MHz, 40 MHz, 80 MHz and 160 MHz wide channels, e.g., in 802.11ac. 40 MHz and 80 MHz channels may be formed, for example, by combining contiguous 20 MHz channels. A 160 MHz channel may be formed, for example, by combining eight contiguous 20 MHz channels or by combining two non-contiguous 80 MHz channels, which may be referred to as an 80+80 configuration. An 80+80 configuration may be passed through a segment parser that divides data into two streams, for example, after channel encoding. Inverse Fast Fourier Transform (IFFT) and time domain processing may be performed, for example, on each stream separately. Streams may be mapped onto two channels. Data may be transmitted on the two channels. A receiver may reverse a transmitter mechanism. A receiver may recombine data transmitted on multiple channels. Recombined data may be sent to Media Access Control (MAC).

Sub-GHz (e.g. MHz) modes of operation may be supported, for example, by 802.11af and 802.11ah. Channel operating bandwidths and carriers may be reduced, for example, relative bandwidths and carriers used in 802.11n and 802.11ac. 802.11af may support, for example, 5 MHz, 10 MHz and 20 MHz bandwidths in a TV White Space (TVWS) spectrum. 802.11ah may support, for example, 1 MHz, 2 MHz, 4 MHz, 8 MHz and 16 MHz bandwidths in non-TVWS spectrum. An example of a use case for 802.11ah may be support for Meter Type Control (MTC) devices in a macro coverage area. MTC devices may have limited capabilities (e.g., limited bandwidths) and may be designed to have a very long battery life.

WLAN systems (e.g., 802.11n, 802.11ac, 802.11af and 802.11ah systems) may support multiple channels and channel widths, such as a channel designated as a primary channel. A primary channel may, for example, have a bandwidth equal to the largest common operating bandwidth supported by STAs in a BSS. Bandwidth of a primary channel may be limited by an STA that supports the smallest bandwidth operating mode. In an example of 802.11ah, a primary channel may be 1 MHz wide, for example, when there are one or more STAs (e.g., MTC type devices) that support a 1 MHz mode while an AP and other STAs support a 2 MHz, 4 MHz, 8 MHz, 16 MHz or other channel bandwidth operating modes. Carrier sensing and NAV settings may depend on the status of a primary channel. As an example, all available frequency bands may be considered busy and remain idle despite being available, for example, when a primary channel has a busy status due to an STA that supports a 1 MHz operating mode transmitting to an AP on the primary channel.

Available frequency bands may vary between different regions. As an example, in the United States, available frequency bands used by 802.11ah may be 902 MHz to 928 MHz in the United States, 917.5 MHz to 923.5 MHz in Korea and 916.5 MHz to 927.5 MHz in Japan. Total bandwidth available may vary between different regions. As an example, the total bandwidth available for 802.11ah may be 6 MHz to 26 MHz depending on the country code.

Spectral efficiency may be improved, for example, by downlink Multi-User Multiple-Input/Multiple-Output (MU-MIMO) transmission to multiple STAs in the same symbol's time frame, e.g., during a downlink OFDM symbol. Downlink MU-MIMO may be implemented, for example, in 802.11ac and 802.11ah. Interference of waveform transmissions to multiple STAs may be avoided, for example, when downlink MU-MIMO uses the same symbol timing to multiple STAs. Operating bandwidth of a MU-MIMO transmission may be limited to the smallest channel bandwidth supported by STAs in a MU-MIMO transmission with an AP, for example, when STAs involved in a MU-MIMO transmission with an AP use the same channel or band.

IEEE 802.11TM High Efficiency WLAN (HEW), which may be referred to as HE, may enhance the quality of service (QoS) experienced by wireless users in many usage scenarios, such as high-density deployments of APs and STAs in 2.4 GHz and 5 GHz bands. HEW Radio Resource Management (RRM) technologies may support a variety of applications or usage scenarios, such as data delivery for stadium events, high user density scenarios such as train stations or enterprise/retail environments, video delivery and wireless services for medical applications. HEW may be implemented, for example, in IEEE 802.11ax.

Short packets, which may be generated by network applications, may be applicable in a variety of applications, such as virtual office, TPC acknowledge (ACK), Video streaming ACK, device/controller (e.g., mice, keyboards, game controls), access (e.g. probe request/response), network selection (e.g., probe requests, Access Network Query Protocol (ANQP)) and network management (e.g., control frames).

MU features, such as uplink (UL) and downlink (DL) Orthogonal Frequency-Division Multiple Access (OFDMA) and UL and DL MU-MIMO, may be implemented in 802.11ax. OFDMA may exploit channel selectivity, for example, to improve or maximize frequency selective multiplexing gain in dense network conditions. A mechanism may be designed and defined for feedback, for example, to enable fast link adaptation, frequency selective scheduling and resource unit based feedback.

OFDMA numerology for HEW may be provided. OFDMA building blocks may be, for example, 20 MHz, 40 MHz and 80 MHz.

Figure 2:
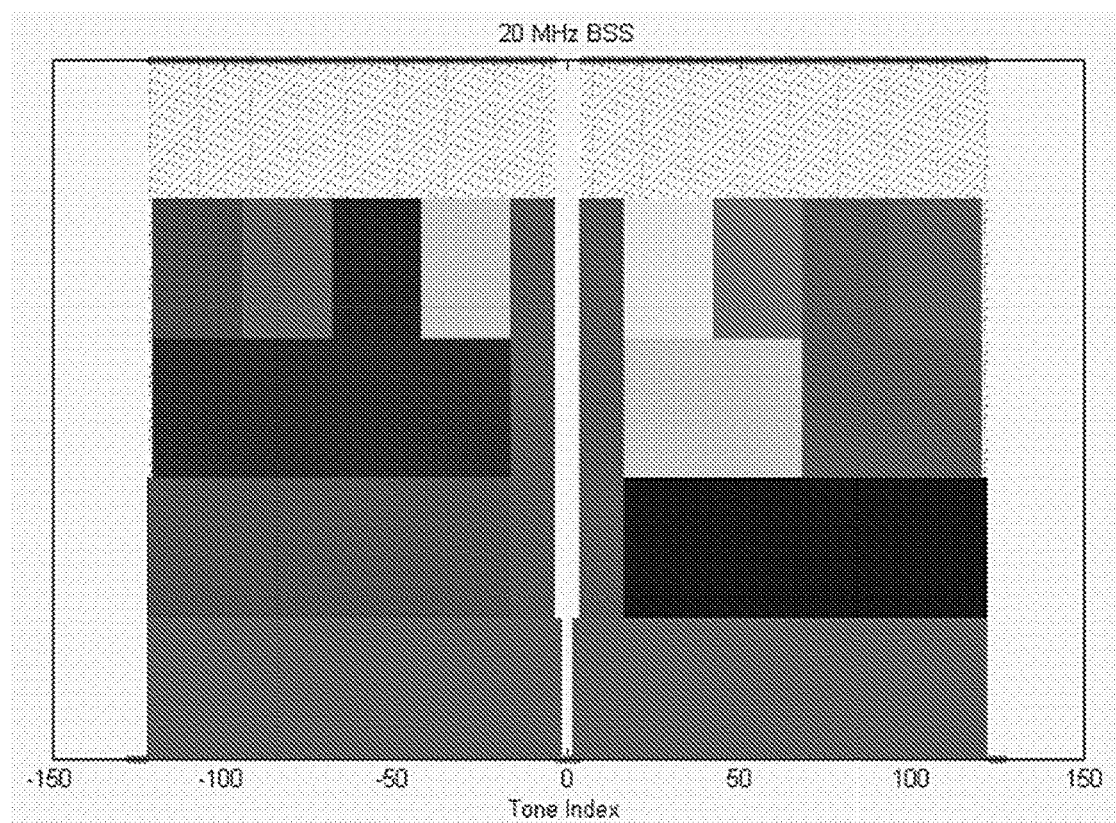
FIG. 2 is an example of OFDMA numerology for a 20 MHz building block.

FIG. 2 is an example of OFDMA numerology for a 20 MHz building block. A 20 MHz OFDMA building block may be defined, for example, as 26-tone with 2 pilots, 52-tone with 4 pilots and 106-tone with 4 pilots. As an example, there may be 7 DC Nulls and (6,5) guard tones (e.g., 6 guard tones on the left hand side and 5 guard tones on the right hand side), for example, at locations shown in FIG. 2. An OFDMA PPDU may carry a mix of different tone unit sizes within a 242 tone unit boundary.

Figure 3:
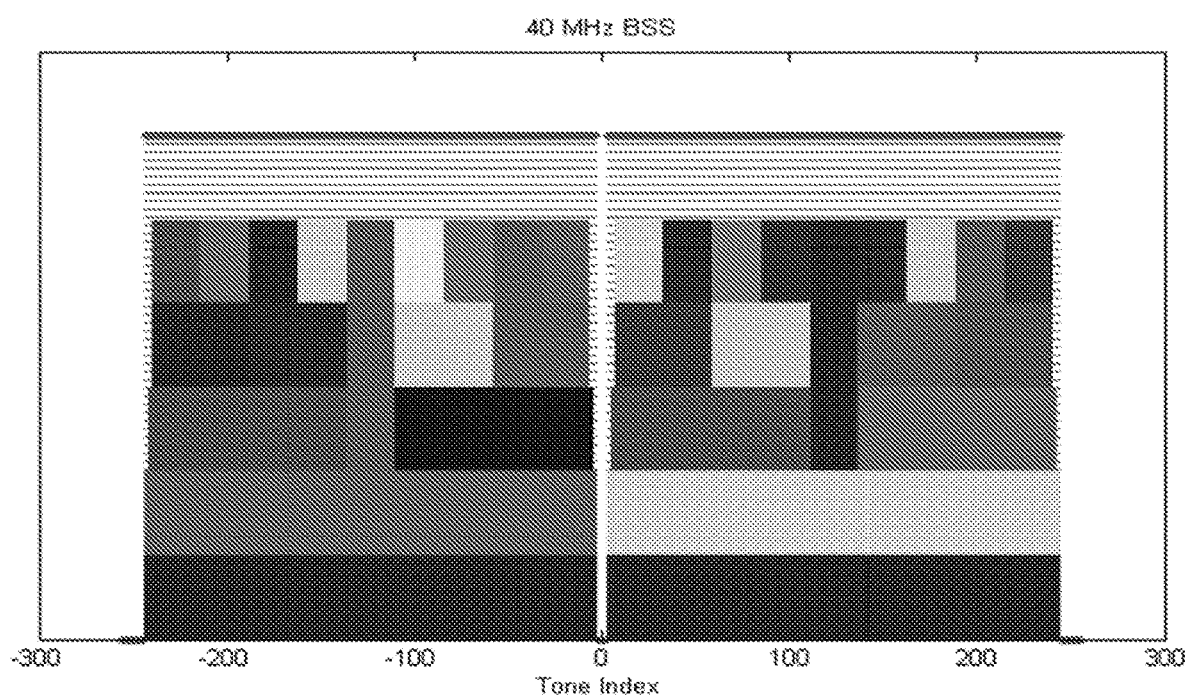
FIG. 3 is an example of OFDMA numerology for a 40 MHz building block.

FIG. 3 is an example of OFDMA numerology for a 40 MHz building block. A 40 MHz OFDMA building block may be defined, for example, as 26-tone with 2 pilots, 52-tone with 4 pilots, 106-tone with 4 pilots and 242-tone with 8 pilots. As an example, there may be 5 DC Nulls and (12,11) guard tones, for example, at locations shown in FIG. 3.

Figure 4:
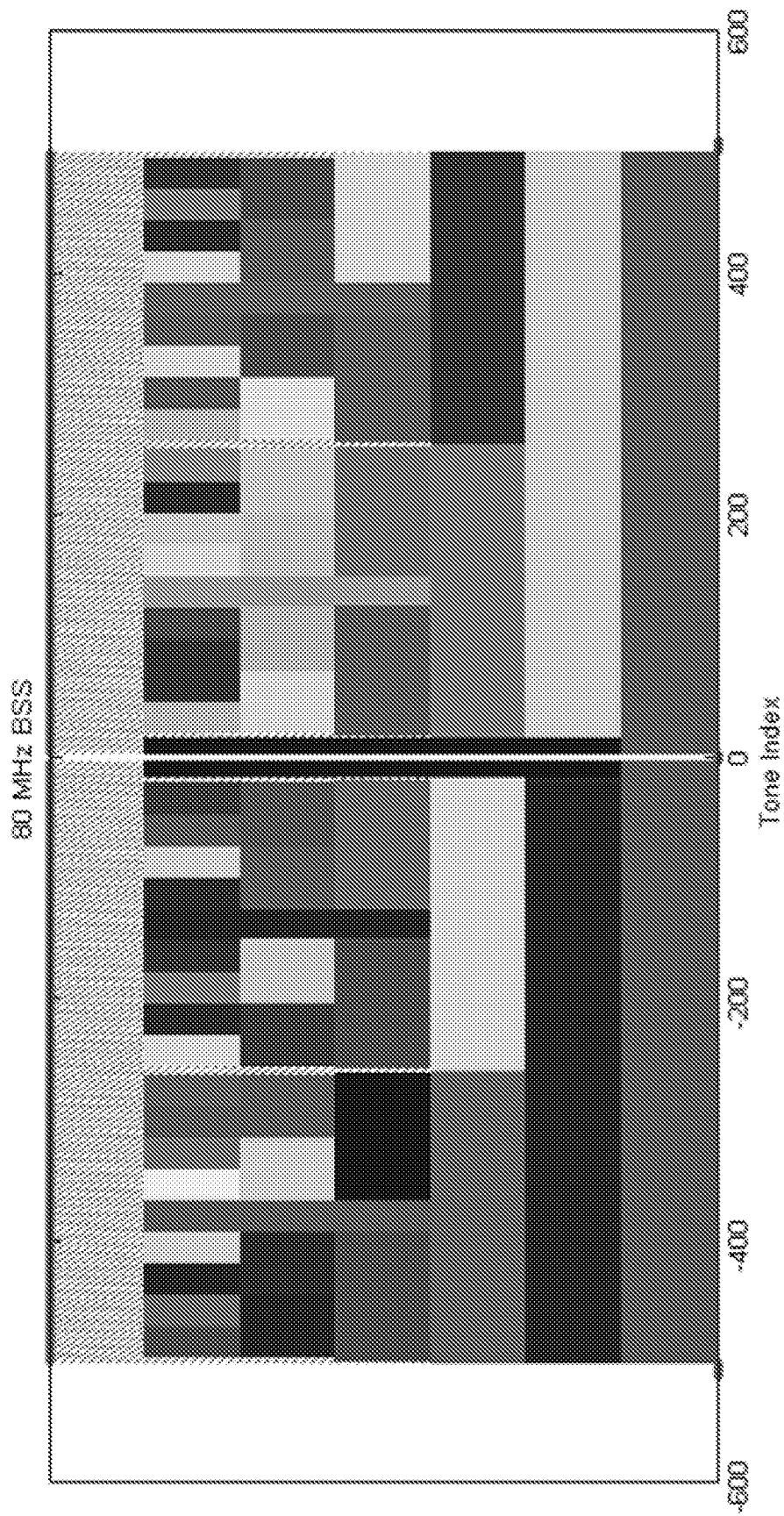
FIG. 4 is an example of OFDMA numerology for an 80 MHz building block.

FIG. 4 is an example of OFDMA numerology for an 80 MHz building block. An 80 MHz OFDMA building block may be defined, for example, as 26-tone with 2 pilots, 52-tone with 4 pilots, 106-tone with 4 pilots, 242-tone with 8 pilots and 484-tone with 16 pilots. As an example, there may be 7 DC Nulls and (12,11) guard tones, for example, at locations shown in FIG. 4.

Figure 4A:
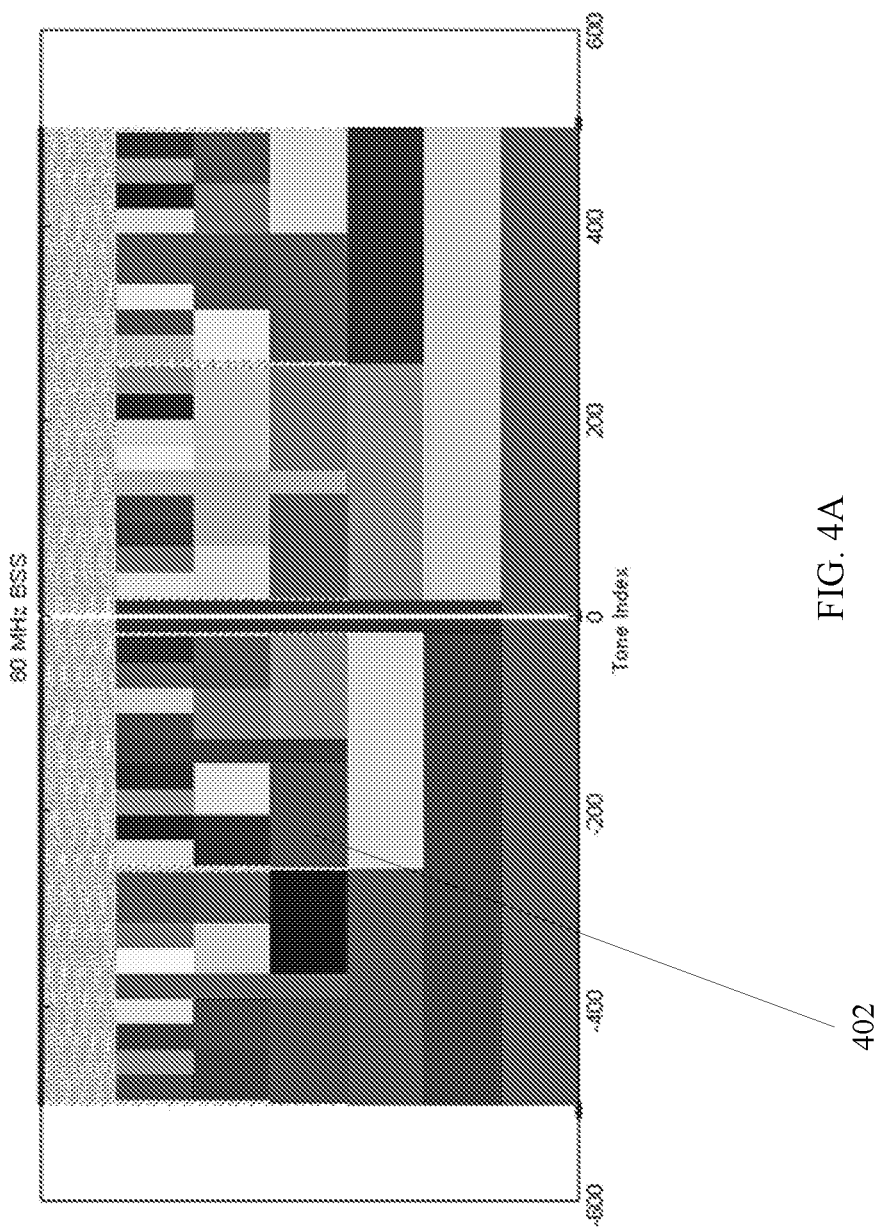
FIG. 4A is an example of a resource unit.

FIG. 4A shows an example of a resource unit 402. A resource unit (RU) may be a collection of resources (e.g., tones) that consist of time and space allocations. A resource unit may be defined to account for a minimum feedback granularity of less than a particular bandwidth, such as for example 20 MHz. Also, the definition of a RU may include tones that are allocated over a particular space/frequency block of the OFDMA numerology.

One or more of a legacy Short Training Field (STF), Long Training Field (LTF), and Signal (SIG) Field may be provided. High Efficiency (HE) SIG-A and SIG-B design may be provided.

An HE PLCP (Physical Layer Convergence Protocol) protocol data unit (PPDU) may comprise a legacy (L) preamble (e.g., L-STF, L-LTF and L-SIG), which may be duplicated on each 20 MHz block, for example, for backward compatibility with legacy devices.

An HE-SIG-A may be duplicated on each 20 MHz block, for example, after the legacy preamble to indicate common control information. As an example, an HE-SIG-A may be implemented using a Discrete Fourier Transform (DFT) period of 3.2 µs and subcarrier spacing of 312.5 kHz.

An HE-SIG-B may be implemented, for example, using a DFT period of 3.2 us and subcarrier spacing of 312.5 kHz Resource Allocation in other Technologies.

A feedback approach in 3GPP Long Term Evolution (LTE) may comprise WTRUs sending back a combination of a Channel Quality Indicator (CQI), Precoding Matrix Indicator (PMI) and a Rank Indicator (RI), for example, depending on a feedback mode.

Feedback may be periodic or aperiodic. In periodic reporting, the WTRU may report CQI, PMI, and/or RI. The WTRU may report with reporting periods. The reporting periods may be configured by a higher layer. The feedback may be transmitted on the Physical Uplink Control Channel (PUCCH). Below is an example of CQI and PMI feedback types for PUCCH reporting modes.

TABLE 1

CQI and PMI Feedback Types for PUCCH Reporting Modes

| | | PMI Feedback Type | |
|---|---|---|---|
| | | No PMI | Single PMI |
| PUCCH CQI Feedback Type | Wideband (Wideband CQI) | Mode 1-0 | Mode 1-1 |
| | WTRU Selected (subband CQI) | Mode 2-0 | Mode 2-1 |

The transmissions modes may be:

Transmission mode 1: Modes 1-0, 2-0
Transmission mode 2: Modes 1-0, 2-0
Transmission mode 3: Modes 1-0, 2-0
Transmission mode 4: Modes 1-1, 2-1
Transmission mode 5: Modes 1-1, 2-1
Transmission mode 6: Modes 1-1, 2-1
Transmission mode 7: Modes 1-0, 2-0
Transmission mode 8: Modes 1-1, 2-1 if the WTRU is configured with PMI/RI reporting; modes 1-0, 2-0 if the WTRU is configured without PMI/RI reporting.
Transmission mode 9: Modes 1-1, 2-1 if the WTRU is configured with PMI/RI reporting and the number of CSI-RS ports>1; modes 1-0, 2-0 if the WTRU is configured without PMI/RI reporting or the number of CSI-RS ports=1.
Transmission mode 10: Modes 1-1, 2-1 if the WTRU is configured with PMI/RI reporting and the number of CSI-RS ports>1; modes 1-0, 2-0 if the WTRU is configured without PMI/RI reporting or the number of CSI-RS ports=1.

In aperiodic reporting, the WTRU may feedback more detailed information in a single reporting instance. The feedback may be transmitted on the Physical Uplink Shared Channel (PUSCH) and the report timing may be triggered by Downlink Control Information (DCI). An example of CQI and PMI feedback types for PUSCH reporting modes is shown below.

TABLE 2

CQI and PMI Feedback Types for PUSCH Reporting Modes

| | | PMI Feedback Type | | |
|---|---|---|---|---|
| | | No PMI | Single PMI | Multiple PMI |
| PUSCH CQI Feedback Type | Wideband (Wideband CQI) | | | Mode 1-2 |
| | WTRU Selected (subband CQI) | Mode 2-0 | | Mode 2-2 |
| | Higher Layer-configured (subband CQI) | Mode 3-0 | Mode 3-1 | |

The transmissions modes may be:

Transmission mode 1: Modes 2-0, 3-0
Transmission mode 2: Modes 2-0, 3-0
Transmission mode 3: Modes 2-0, 3-0
Transmission mode 4: Modes 1-2, 2-2, 3-1
Transmission mode 5: Modes 3-1
Transmission mode 6: Modes 1-2, 2-2, 3-1
Transmission mode 7: Modes 2-0, 3-0
Transmission mode 8: Modes 1-2, 2-2, 3-1 if the WTRU is configured with PMI/RI reporting; modes 2-0, 3-0 if the WTRU is configured without PMI/RI reporting.
Transmission mode 9: Modes 1-2, 2-2, 3-1 if the WTRU is configured with PMI/RI reporting and the number of CSI-RS ports>1; modes 2-0, 3-0 if the WTRU is configured without PMI/RI reporting or the number of CSI-RS ports=1.
Transmission mode 10: Modes 1-2, 2-2, 3-1 if the WTRU is configured with PMI/RI reporting and the number of CSI-RS ports>1; modes 2-0, 3-0 if the WTRU is configured without PMI/RI reporting or the number of CSI-RS ports=1.

An extension to CQI/PMI/RI feedback modes may be used for aperiodic PUSCH and periodic PUCCH. In PUSCH and PUCCH feedback, a precoder for a subband may be composed of two matrices, for example, where each of the two matrices may belong to a separate codebook and the codebooks are known (or synchronized) at an eNodeB and WTRU. The codebook indices may determine the precoder, for example, where one of the two matrices targets wideband and/or long-term channel properties and the other matrix targets frequency-selective and/or short-term channel properties. Precoder feedback may be deemed a special case of this structure.

WiMax (Worldwide Interoperability for Microwave Access) feedback approaches may comprise code-book based feedback and quantized channel feedback.

WiMax may support codebook based feedback, for example, where a WTRU (e.g., Mobile Station (MS)) indicates to a Base Station (BS) the optimum precoding matrix to be used, e.g., based on the entries of a predefined codebook.

WiMax may support quantized channel feedback, for example, where a WTRU (e.g., MS) may quantize a Multiple-input multiple-output (MIMO) channel and may send this information to the BS, e.g., using a MIMO FEEDBACK message. The BS may use the quantized MIMO channel, for example, to calculate an optimum precoding matrix.

802.11 feedback approaches may comprise Modulation and Coding Scheme (MCS) feedback and Channel State Information (CSI) feedback. In MCS feedback, a WTRU (e.g., station (STA)) may send back (e.g., unsolicited or based on a request) MCS, signal to noise ratio (SNR) and a number of space time streams (N_STS). Feedback may be provided in a VHT variant HT control field, e.g., as shown FIG. 5.

Figure 5:
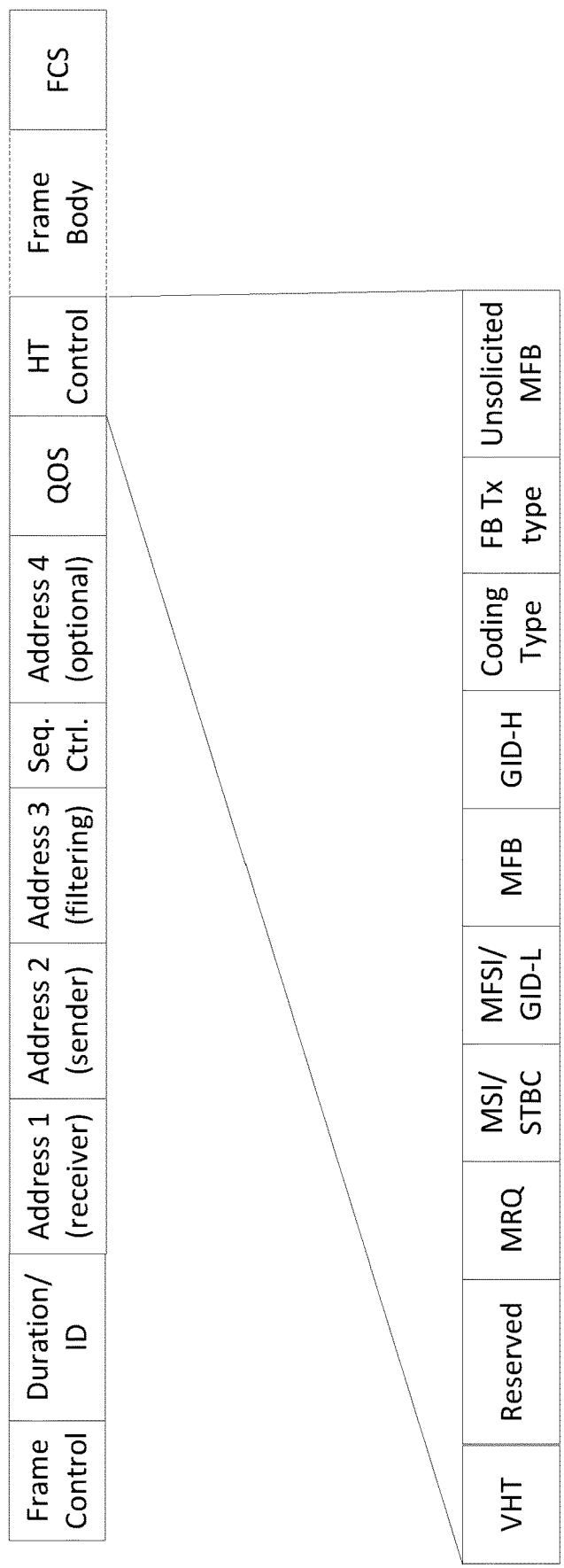
FIG. 5 is an example of a VHT-variant HT control Field for MCS feedback in 802.11ac.

FIG. 5 is an example of a Very High Throughput (VHT) variant of a High Throughput (HT) control Field for MCS feedback in 802.11ac. Fields in an HT control field may comprise the following.

A VHT field (e.g., 1-bit) may indicate that the HT control field is of the VHT variant type.

An MCS Request (MRQ) field (e.g., 1-bit) may indicate a feedback request.

An MRQ sequence identifier (MSI)/Space-Time Block Coding (STBC) field (e.g. 3-bits) may indicate an MRC sequence identifier or an MCS feedback request.

An MCS Feedback Sequence Identifier (MFSI)/Generalized Interference Detection and Localization (GID-L) field (e.g., 3-bits) may indicate an MCS Feedback sequence identifier, e.g., a sequence identifier of an MSI that this frame is responding to.

MCS FeedBack (MFB) field (e.g.,15-bits) may comprise Num_STS, MCS, Bandwidth and SNR feedback. The Number of Space time Streams (NUM_STS) may indicate a recommended number of space time streams. NUM_STS may be sent as an unsigned integer representing the number of STS minus one. MCS may indicate a recommended MCS. MCS may comprise an unsigned integer, e.g., in the range of 0 to 9. BW may comprise a bandwidth for which the recommended MCS, e.g., 0 may indicate 20 MHz, 1 may indicate 40 MHz, 2 may indicate 80 MHz and 3 may indicate 160 MHz and 80+80 MHz. SNR feedback may comprise the SNR averaged over the data subcarriers and space time streams. The SNR may be encoded as a 6-bit two's complement number of SNR_average-22.

A Group ID (high) (GID-H) field (e.g., 3-bit) may comprise the most significant bits (MSB), e.g., highest three bits, of the group ID of a PPDU used to estimate an unsolicited MFB. GID-H may be set to all ones, for example, when an MFB is estimated from an SU-PPDU.

A Coding type field may comprise coding information (e.g., 0 may indicate BCC and 1 may indicate LDPC) of the PPDU used to estimate an unsolicited MFB.

An unsolicited MFB filed may be set to 1, for example, when an MFB is an unsolicited MFB.

An STA may send back explicit feedback of a channel, for example, in Channel State Information (CSI) feedback. CSI channel feedback may comprise, for example, actual channel coefficients, non-compressed BF coefficients and an STS SNR, compressed BF coefficients and STS SNR, where compression may be based on a Givens rotation.

Figure 5A:
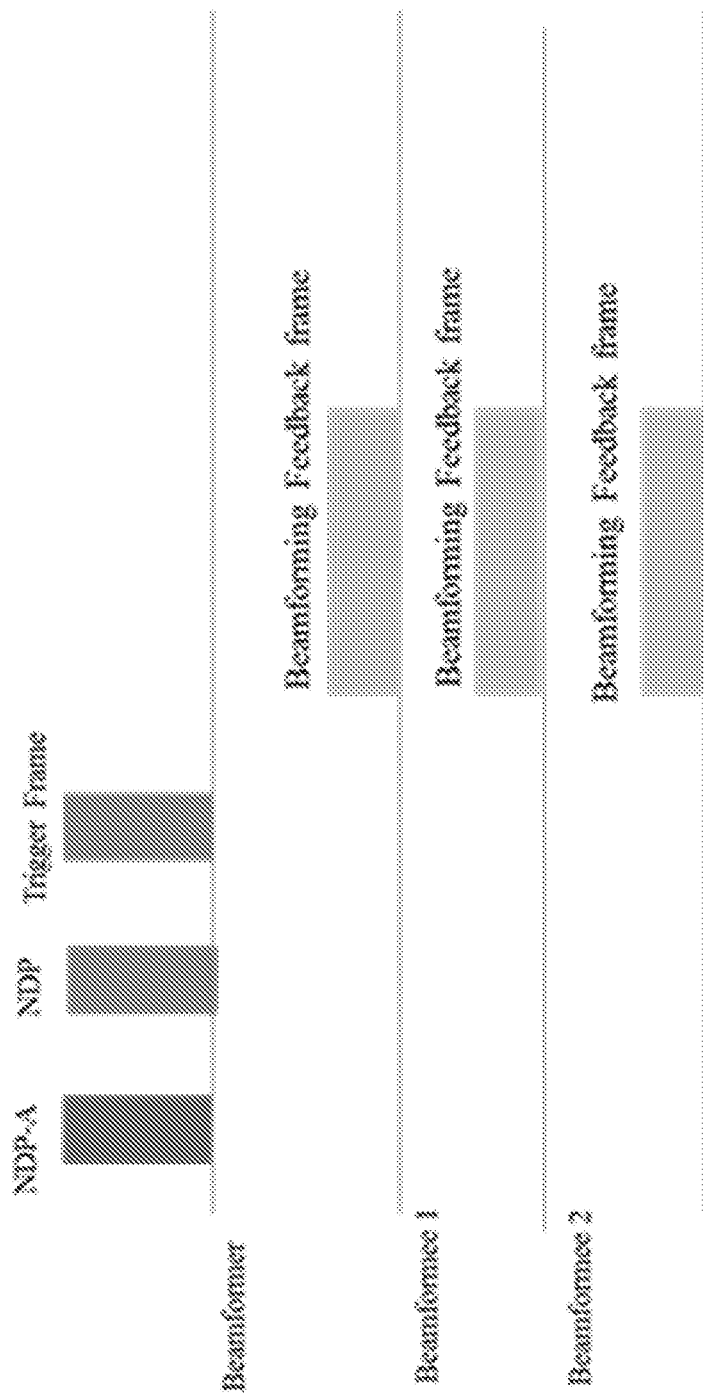
FIG. 5A is an example of a downlink sounding sequence.

A sounding methodology, e.g., for 802.11ax, may be used. The 802.11ax framework may include a CSI feedback mechanism. The CSI feedback mechanism may allow for a feedback granularity, which may be a minimum feedback granularity (e.g., less than 20 MHz). The 802.11ax framework may have a mechanism to enable multiplexing of compressed beamforming action frame (e.g., CSI feedback) from multiple stations using, e.g., UL MU (MIMO or OFDMA) mode. The 802.11ax framework may have a channel sounding sequence. The channel sounding sequence may include trigger information in order to facilitate UL MU mode of Compressed Beamforming Action frame from multiple STAs. FIG. 5A is an illustration of a downlink (DL) sounding sequence.

CSI-based WiFi feedback may be improved, for example, by one or more of the following: (i) line of sight/non-line of sight (LOS/NLOS) multi-component feedback, e.g., dominant and other Eigen modes, (ii) improved Givens rotation based feedback to reduce feedback overhead, (iii) codebook design for new antenna geometry, (iv) time domain and hybrid implicit/explicit feedback, time/frequency feedback, (v) hybrid implicit/explicit feedback, (vi) preamble design to enable channel smoothing, (vii) receiver processing to enable channel smoothing, (viii) unequal protection of feedback bits and (ix) a differential feedback, e.g., Givens rotation based that sends the difference in angles between current and previous feedback instances.

RU-based MCS and CSI request handling in a BSS using OFDMA may be complicated. A BSS may request MCS or CSI information from an RU, a subset of RUs or all RUs in a band. Operation using either SU-MIMO or MU-MIMO may lead to SU-MIMO or MU-MIMO specific handling for those modes of operation. A determination may be made to identify resources that a STA may provide feedback to.

RU-based MCS and CSI feedback from a STA to one or more APs may be solicited or unsolicited. Feedback may be sent back immediately or after a delay. Information (e.g., MCS or CSI) may be fed back in an efficient manner. Resources that correspond to fed back data may be identified. Overhead may be efficiently controlled, for example, given that there may be many RUs to feedback information to. For 802.11ax numerology using a 256 pt FFT (242 used tones), the feedback may increase four-fold. The feedback needed for a specific transmission may be reduced.

There may be interference due to RF I/Q imbalance in OFDMA. In OFDMA, frequency resources presented in the form of sub-channels may be assigned to different radio links that may be in uplink or downlink directions. A sub-channel may be understood to be defined as a collection of RU's in a particular order or arrangement. A signal transmitted over a sub-channel allocated on one side of a channel relative to a central frequency may create interference on the other side of the channel as the image of the original signal due to RF I/Q amplitude and phase imbalances.

Figure 6:
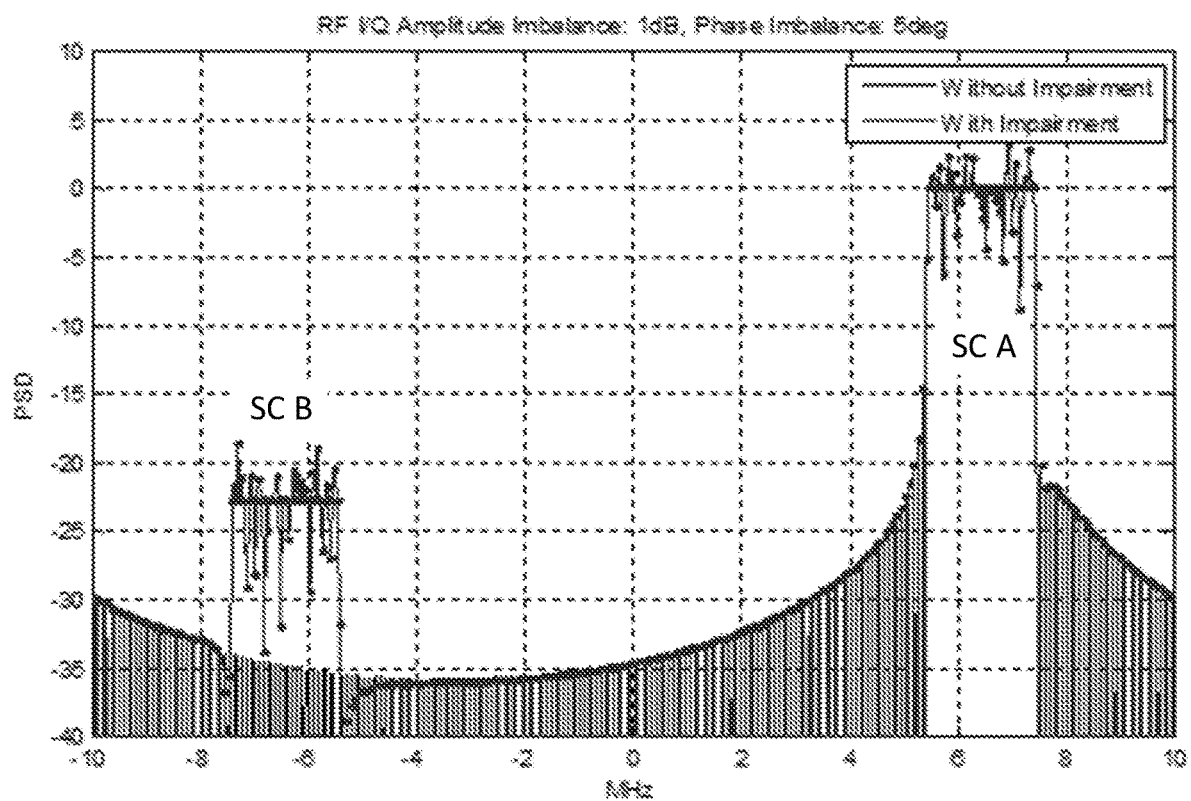
FIG. 6 is an example of power spectrum density for a partially loaded OFDM signal with RF I/Q imbalance.

FIG. 6 is an example power spectrum density of a partially loaded OFDM signal with RF I/Q imbalance. FIG. 6 shows a snapshot of a scenario with 256 subcarriers in a 20 MHz channel. A sub-channel with subcarriers from 199 to 224 (shown as sub-channel (SC) A) is loaded with data. RF I/Q imbalance may generate approximately 23dBr interference in the image of the sub-channel with subcarriers from −119 to −224 (shown as SC B).

In single BSS scenarios, e.g., in OFDMA DL, interference may not be significant, for example, because transmit (Tx) power on all sub-channels are the same as are Rx powers of those sub-channels at each STA. However, in OFDMA UL, interference at the image sub-channel (e.g., SC B) may be significant, for example, when there is no power control or the power control is not accurate. An STA using sub-channel B may be further from the AP than an STA using channel A.

Figure 7:
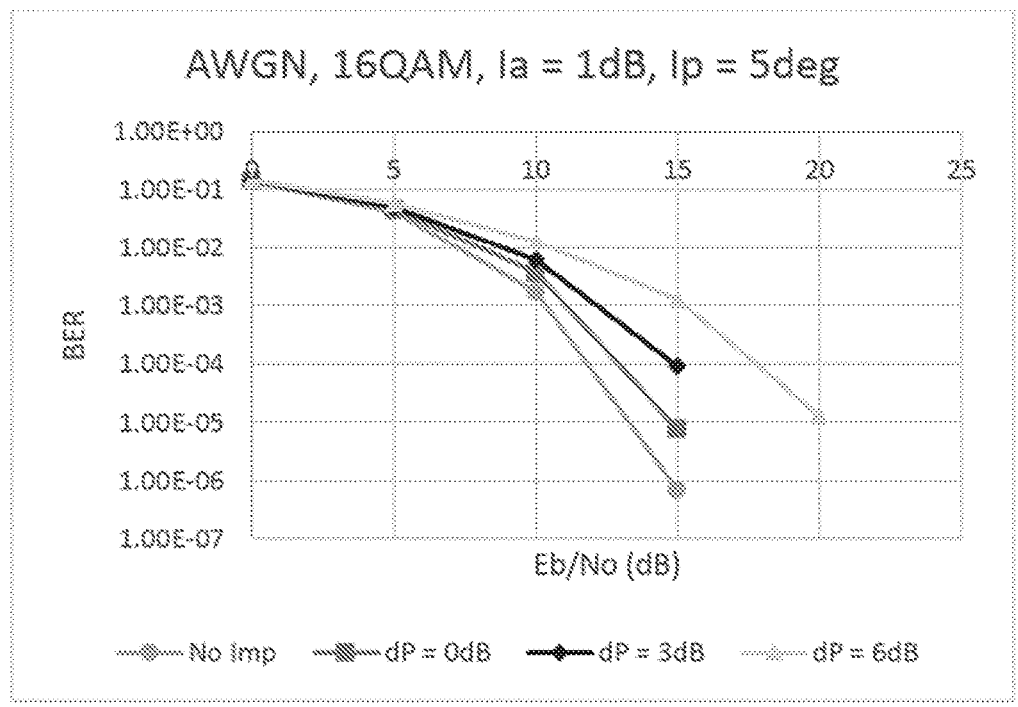
FIG. 7 is an example of Bit Error Rate (BER) performance for an interfered signal.

FIG. 7 is an example of Bit Error Rate (BER) performance for an interfered signal. FIG. 7 shows the BER performance of a signal transmitted on sub-channel B suffering from interference due to transmission on sub-channel A with I/Q imbalance. The line designated dP represents the power difference between sub-channels A and B. dP>0 means signal power on SC B is lower than signal power on SC A. As shown in FIG. 6, there may be significant performance loss, for example, when power is not well controlled.

An 802.11ax STA may use L-SIG to signal 11ax and legacy STAs the remaining duration of the PPDU after the legacy preamble. An equation may be used to convert this time into L_LENGTH in octets that 11 a/g compatible devices would understand.

Figure 8:
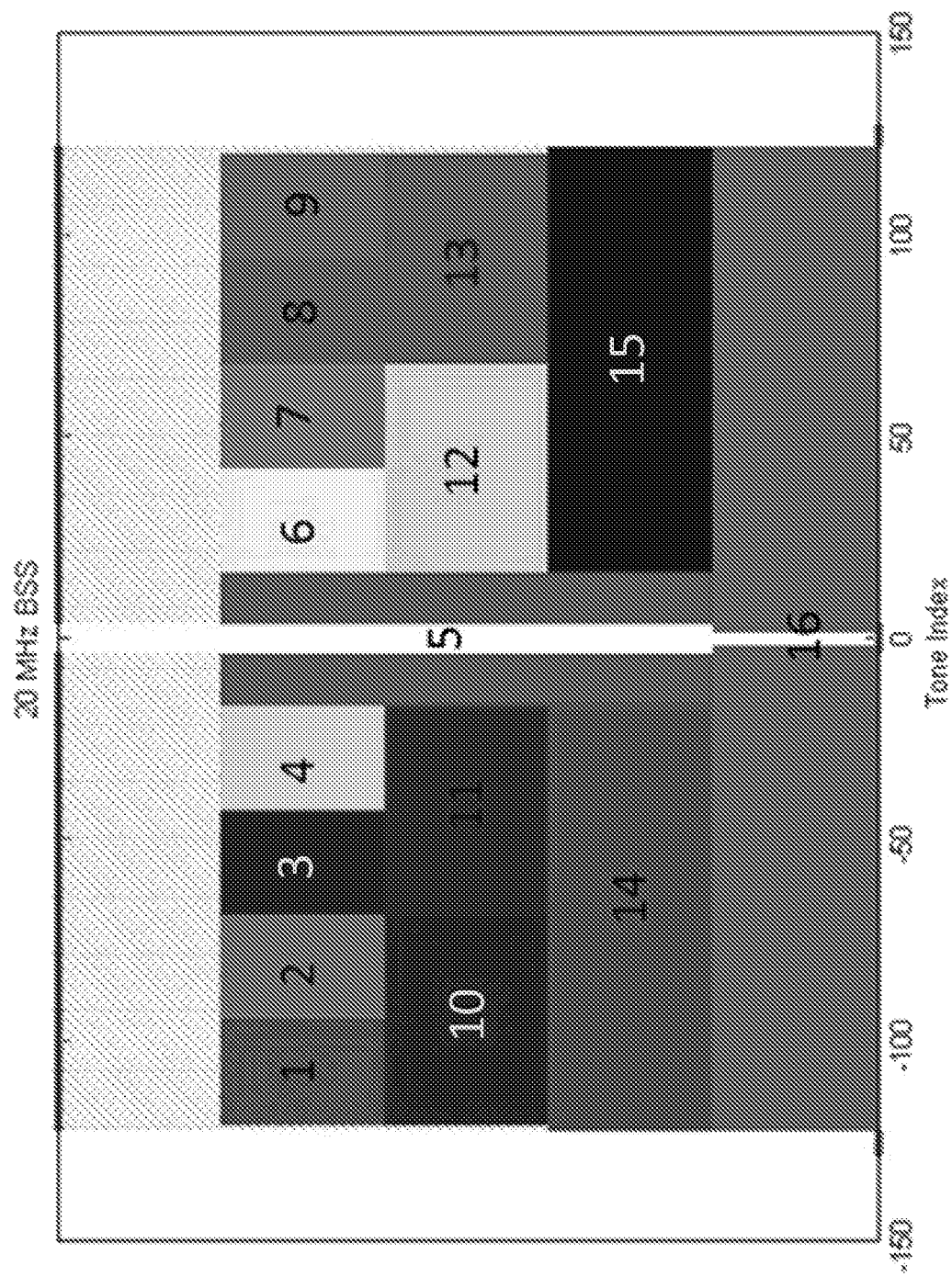
FIG. 8 is an example of 20 MHz BSS allocation with RU allocation labeling.

FIG. 8 is an example of 20 MHz BSS allocation with RU allocation labeling.

Systems, methods, and instrumentalities are disclosed for unified feedback for OFDMA WLAN. Unified feedback may be provided by per-RU-based MCS feedback, per-RU-based CSI feedback and/or feedback with symmetric RU allocation.

RU-based MCS feedback may be provided by RU-Based feedback (MFB), RU labeling compression using source coding, RU labeling compression using hierarchical RU labeling (RU Tree) and/or RU feedback using feedback labeling compression.

RU-based Feedback (MFB) may be provided. RU-based MCS/SINR feedback may comprise an STA feeding back an MCS, SNR/SINR and a Number of Space Time Streams (N_STS) on a per RU basis. Legacy 802.11 may transmit one value of an MCS, SNR/SINR and N_STS for an entire bandwidth (e.g., a Channel State Indication (CSI) feedback mechanism). Feedback overhead for RU-based MCS/SINR feedback may be reduced or minimized, for example, by taking multiple factors into account, such as feedback granularity, quantization and frequency/delay.

A granularity of feedback may comprise a bandwidth over which a feedback metric is measured. As an example, one value per 26 tones may indicate 9 RU granularity in a 20 MHz bandwidth.

Feedback quantization may indicate how feedback is measured/quantized.

Feedback frequency/delay may indicate how often information is fed back to a transmitter and how soon after it is fed back a scheduler may utilize the information for scheduling.

These and/or other factors may influence, for example: (i) feedback overhead and (ii) gain achievable from user scheduling (at the transmitter) feedback overhead and the scheduling gain that may be obtained from the information fed back. A feedback scheme may seek to minimize i and maximize ii.

Figure 9B:
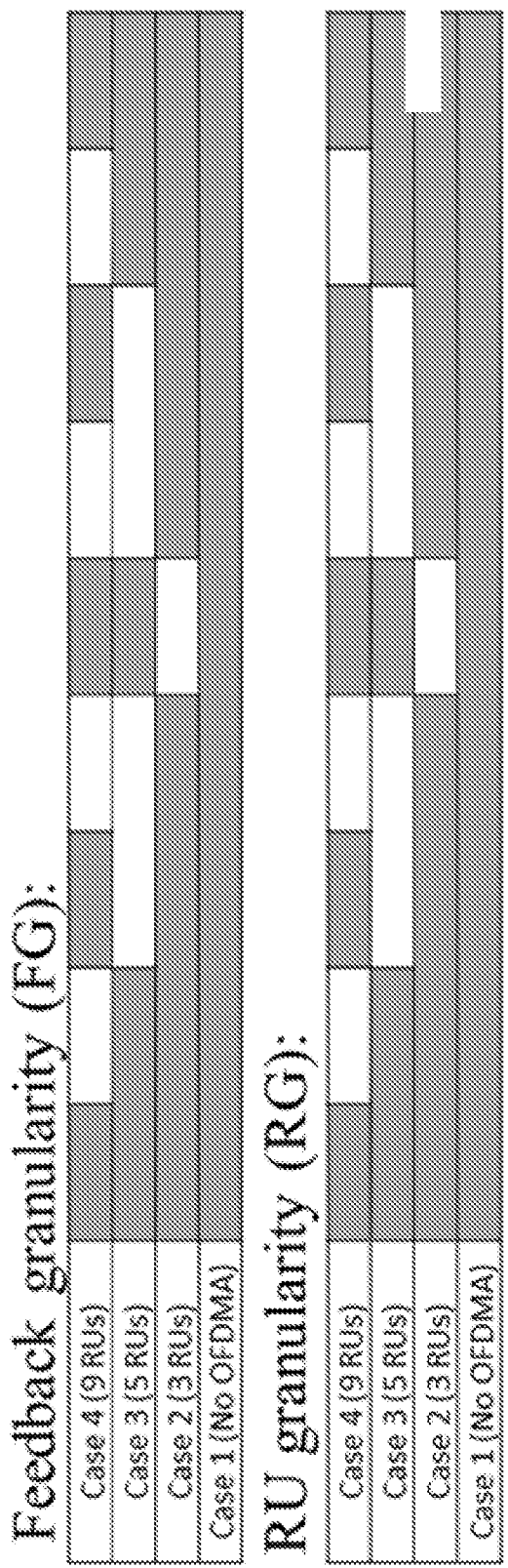

FIG. 9 is an example of feedback granularity (e.g., at a receiver and/or transmitter). A receiver may feedback an average SINR, N_STS, and/or MCS to a transmitter and the transmitter may use this information for scheduling. Information fed back may permit a scheduler to estimate smaller or larger granularities.

An example of RU-based MCS feedback for OFDMA in 802.11 is presented below. One or more of the following may apply.

A STA A may join a network, for example, by starting authentication (e.g., a process by which an AP and STA establish their identities) and by sending an association request to the AP based on at least one of the following conditions.

An AP A may transmit a beacon. STA A may join the network, for example, when the beacon indicates an RU based link adaptation capable network and STA A is RU based link adaptation capable. AP A and STA A may operate using RU based link adaptation with associated feedback.

STA A may join the network, for example, when the beacon indicates a non-RU based link adaptation capable network. AP A and STA A may operate in a non-RU based link adaptation capable manner, for example, regardless of STA A's OFDMA capability.

AP A may disallow STA A access to the network (e.g., STA A does not join the network or start the authentication process), for example, when the beacon indicates an RU based link adaptation capable network and STA A is non-RU based link adaptation capable.

A capabilities information element (e.g., a new capabilities information element) may be sent by STA A in an association request or re-association request frame. AP A may accept or reject the STA based on the (re)association request.

A capability information element may indicate, for example, a type of link adaptation supported and a type of compression. A type of link adaptation supported may indicate, for example, (a) no support; (b) unsolicited RU based link adaptation only or (c) solicited and unsolicited RU based link adaptation. A type of compression may indicate, for example, (a) uncompressed RU based link adaptation feedback or (b) compressed RU based link adaptation feedback.

AP A may send a sounding sequence and an MCS Request, for example, for solicited RU based link adaptation. An MCS Request (MRQ) may be sent in a staggered sounding PPDU or a Null Data Packet (NDP). An MRQ may comprise, for example: (i) information to indicate that it is a request, (ii) granularity of feedback requested, e.g., feedback based on 26 RUs, 52 RUs, 104 RUs, etc., (iii) a feedback mode, and/or (iv) an MCS Request Sequence Identified (MSFI), e.g., to enable STA A to indicate the request it is replying to in the feedback.

STA A may measure channel and feedback RU based information based on a feedback mode, for example, for unsolicited RU-based link adaptation.

In one option, we may define a scheduling or RU granularity (RG) indicating the granularity with which the scheduling takes place. We may define a feedback granularity (FG) indicating the granularity with which the feedback takes place. @ Receiver: Instantaneous rates on the sub-channels (e.g., defined based on feedback granularity (FG)) may be calculated and fed back to the transmitter. @Transmitter: Instantaneous rates on the RUs (e.g., defined based on RU granularity (RG)) may be calculated for each station and proportional fair scheduling is performed.

The RG may be transmitted from the AP to the STA. It may be transmitted during STA association, transmitted in a field in the MCS request frame or transmitted by a dedicated RG request frame. The FG may be determined by the STA. One or more of FIG. 9A, 9B, or 9C may apply.

A feedback mode may determine the feedback granularity (FG) and amount of feedback each STA sends to an AP. Examples of feedback modes include: (i) feedback information for all RUs, e.g., 1 through 16, (ii) feedback information for a specific RU, e.g., 1, 2, . . . , 16, (iii) feedback information for RUs of a specific type (e.g., RUs of a certain size indicating to the AP a preference for allocations of that size, such as an RU size of 104 subcarriers [RU14, RU15], RU size of 52 subcarriers [RU10, RU11, RU12, RU13]), (iv) feedback information based on a desired feedback compression mode, and (v) feedback information for N-top RUs (e.g., best-N bands may be fed back from each STA. The number of bands may be specified by the AP or independently decided on by each STA, e.g., determined by access categories and buffer occupancy (e.g., in uplink).

A feedback mode may be, for example, determined by an AP, determined by an AP but overridden by each STA or determined independently by each STA.

Information fed back may include one or more of the following: The Number of Space Time Streams (N_STS) for the STA and/or effective SNR value and recommended MCS for each RU. Feedback of the Number of Space Time Streams (N_STS) for the STA may comprise a value set semi-statically at the beginning of a transmission, for example, when only one value is needed for the entire transmission bandwidth. SNR may be estimated for use by (e.g., combined for) multiple RUs. As an example, information on RU10 may be implied from feedback of information on RU1 and RU2.

Information fed back for each RU may be fed back in a MAC frame. Information may be fed back in a frame header or in a frame body. In an example, a feedback frame may be sent with no frame body.

Figure 10:
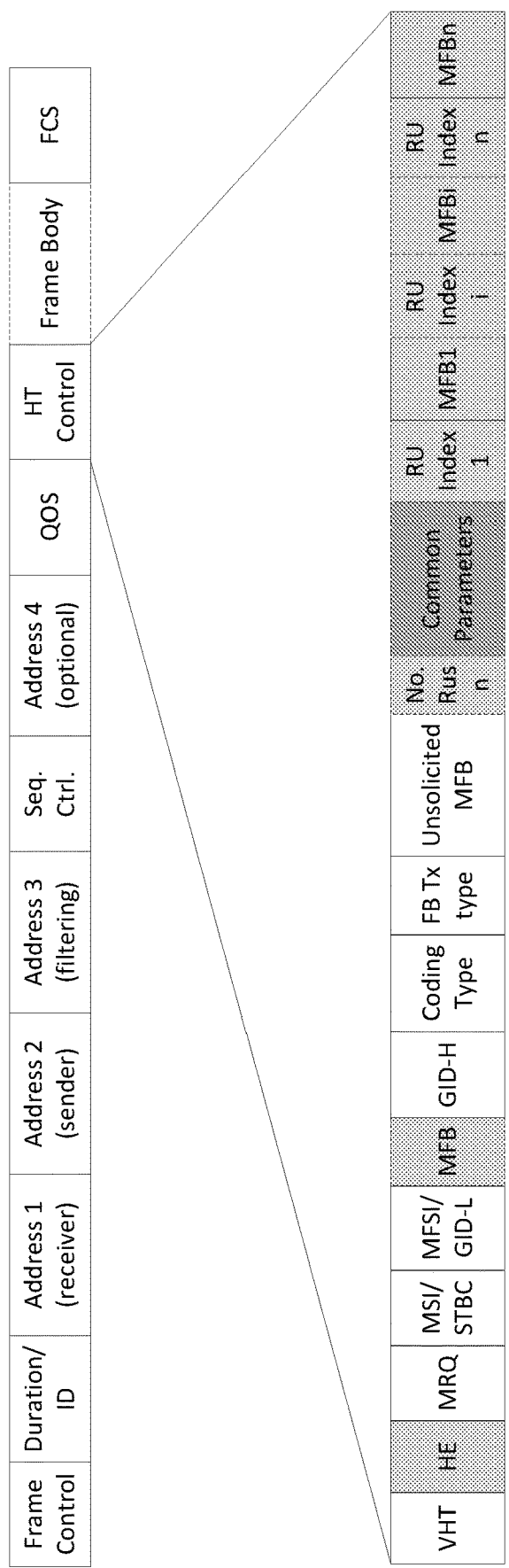
FIG. 10 is an example of MCS feedback frame 1.

FIG. 10 is an example of MCS feedback frame 1.

Figures 11, 12:
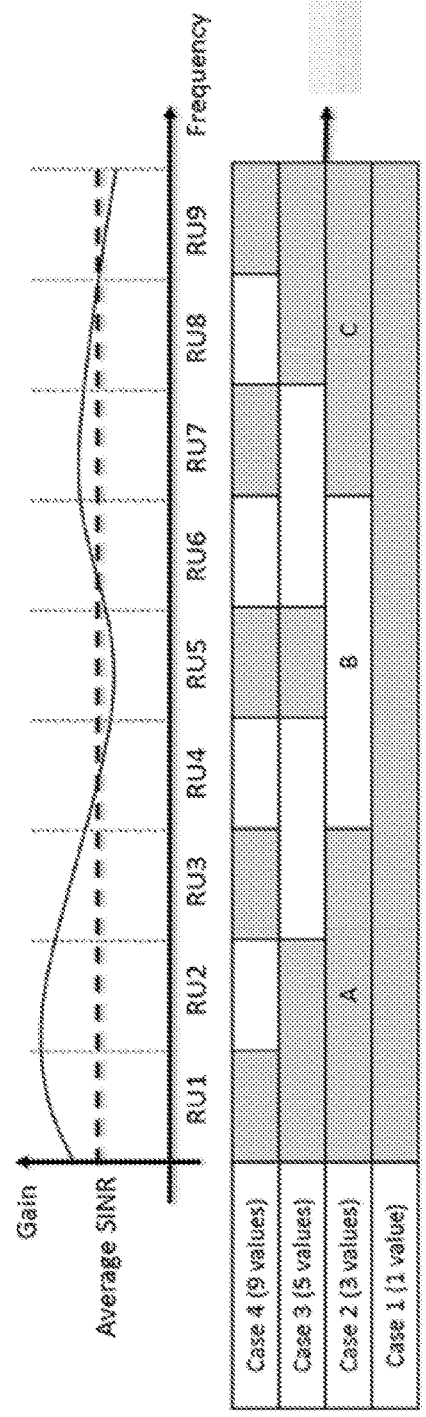
FIG. 11 is an example of MCS feedback frame 2.
FIG. 12 is an example of RU granularities.

FIG. 11 is an example of MCS feedback frame 2.

As shown in examples in FIGS. 10 and 11, a field (e.g., an HT control field) in a frame header may be re-used to feed back MCS information, where one or more of the following may apply. An HE variant may be defined for an HT control field. The first bit of an HT control field may be used to indicate a VHT or a HT variant. The first two bits of an HT control field may be used to indicate an HE, VHT or HT variant.

An HE field (e.g., 1-bit) may be a reserved bit of the HT control Middle subfield of the VHT variant HT control field. The HE field may be set to 1, for example, to indicate an HE variant MCS signal.

An MFB field (e.g., 15-bits) may comprise NUM_STS, MCS, Bandwidth and SNR feedback. In an example, an MCS feedback field (MFB) in the VHT field may be used, for example, to feed back information as if no OFDMA transmission will occur (e.g., legacy feedback) and additional fields may be used to feed back information on specific RUs (e.g., as shown in FIG. 10). In an example, MFB may be used (e.g., only) for specified RUs (e.g. as shown in FIG. 11). The number of bits used to feed back an MFB may be reduced, for example, by sending one NUM_STS and BW field for all RUs in a common parameter field (e.g., which may be inserted in other frames disclosed herein) and/or eliminating the BW field (e.g., 2-bits), e.g., when the RU size implicitly indicates the BW.

A number of RUs field (e.g., 4-bits for 20 MHz transmission) may be set to enable an AP to know or determine how many RUs are being fed back. A number of RUs field may be scaled as the transmission bandwidth increases. A number of RUs field may be reduced, for example, based on the maximum number of RUs that may be scheduled per STA. An AP may (e.g., blindly) decode the number of RUs fed back.

An RU index i field may indicate the field the MFB is meant for. This field may be dependent on labeling compression. An RU index field may be omitted, for example, when there is a scenario where the RUs to be fed back are pre-determined (e.g., feedback of RU1 through RU9).

An MFBi field may provide MCS Feedback for RU index i. The MFB for the RU indices may, for example, use the same table as the legacy MFB index (e.g., 15 bits). The MFB for the RU indices may, for example, use a desired compression to reduce the overall feedback overhead. For example, a CSI feedback mechanism may permit feedback (e.g., minimum feedback) granularity (e.g., less than 20 Mhz).

FIG. 12 is an example of RU granularities. FIG. 12 shows four different granularities, although any number of granularities is possible.

Figure 13:
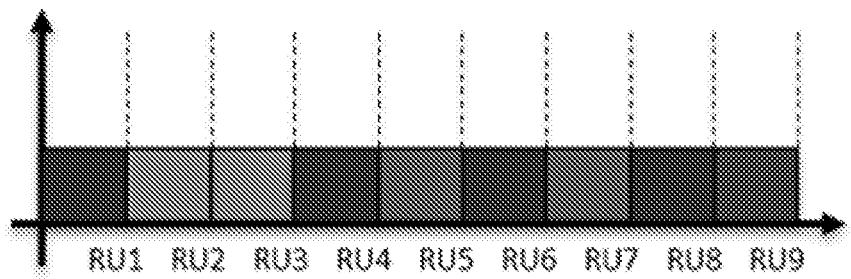
FIG. 13 is an example of receiver granularities with multiple RUs scheduling granularity.

FIG. 13 is an example of receiver granularities with multiple RUs scheduling granularity. FIG. 13 shows nine RUs scheduling four different granularities.

FIGS. 12 and 13 show an effective channel and various corresponding feedback granularities based on a 20 MHz numerology shown in FIG. 8. In each case example, an average SINR or MCS may be fed back to the transmitter.

Figure 14:
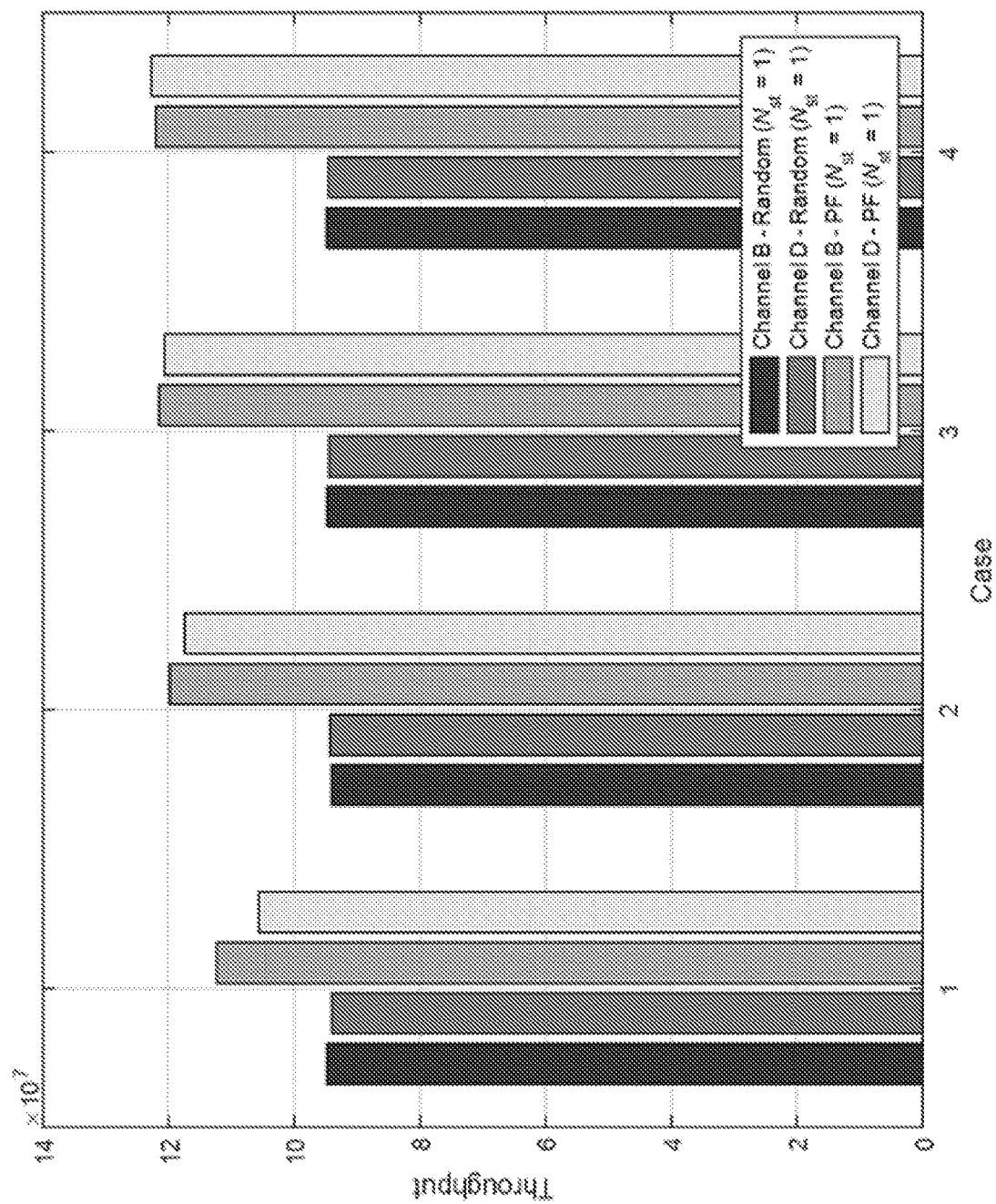
FIG. 14 is an example of scheduling throughput for four case examples in FIG. 13.

FIG. 14 is an example of scheduling throughput for four case examples in FIG. 13. Results in FIG. 14 show that, for example, case 3 with five feedback values achieves the same throughput as case 4 with nine feedback values, which may imply lower feedback overhead without any scheduling loss. The number of bits used for feedback or the number of bits used in labeling the feedback may be optimized. This may reduce the feedback overhead.

Figure 14A:
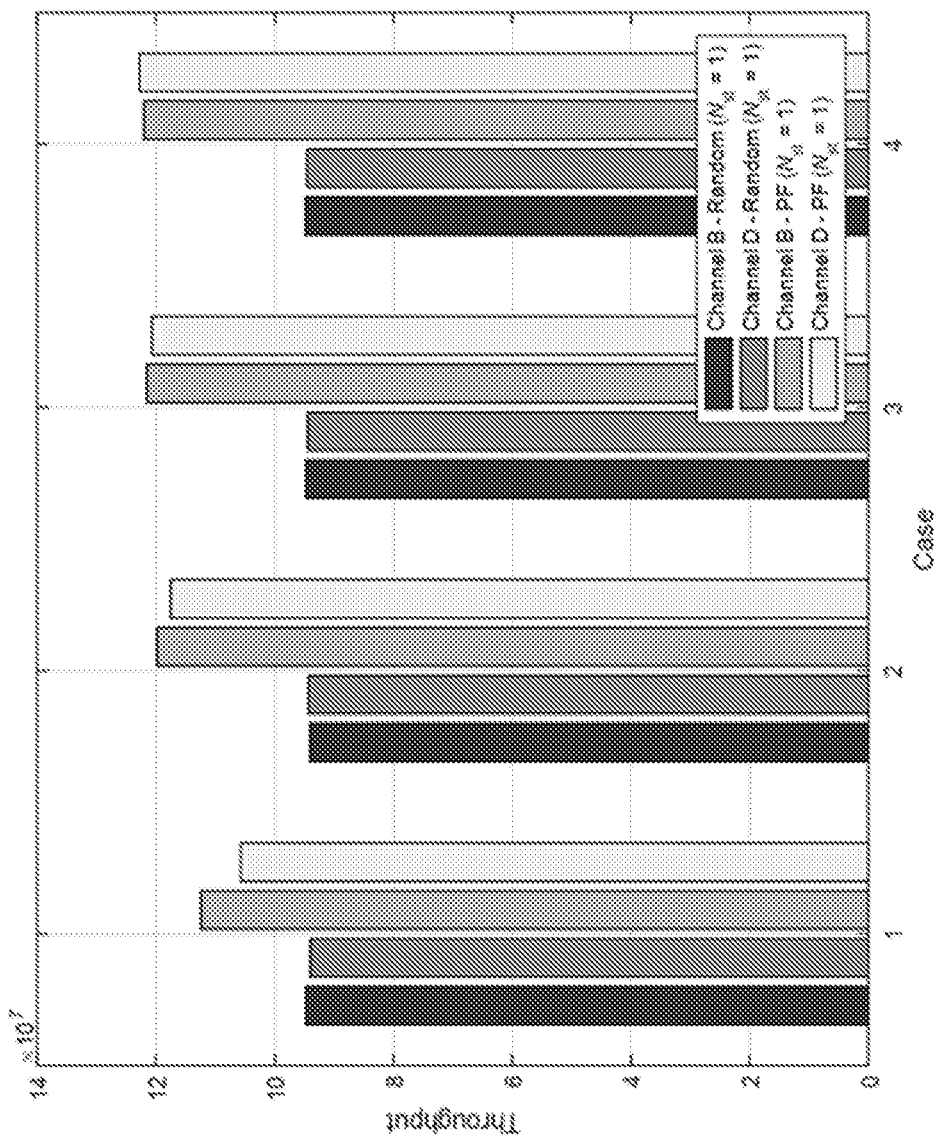
FIG. 14A is an example of scheduling gain with different bit quantization.

RU feedback compression using an SNR deviation report may be used. The number of bits used to feed back the MFB may affect the scheduling gain achievable and/or the feedback overhead, in for example OFDMA for WLANs. The scheduling gain may increase with an increasing number of quantized bits. Increasing the number of quantized bits may increase the feedback overhead. FIG. 14A shows an example of the effect of quantization on scheduling gains. FIG. 14A demonstrates that the scheduling gain seen with 6-bit quantization may be equal to the scheduling gain with no quantization. FIG. 14A shows scheduling gain with different bit quantization. Case 1 uses 1-bit. Case 2 uses 3-bits. Case 3 uses 6 bits. Case 4 has no quantization. The SINR value may be quantized and fed back to the transmitter with [40,53] dB is mapped to $2^N-1$ values. The results show that 6-bit quantization of SINR for each RU (e.g., MFB:SNR quantization in 802.11ac) may be sufficient to extract scheduling gains.

An SNR/MCS deviation report may be fed back (e.g., on a per RU basis). The SNR/MCS deviation report feedback may reduce the feedback overhead. This report feedback may be in addition to the MFB for the transmission bandwidth. The SNR/MCS deviation report may feed back the deviation in dB of the SNR and/or the change in MCS of each RU or group of sub-carriers from the average SNR/MCS across the transmission bandwidth. The number of bits needed may be reduced. This may allow for an overall reduction in the size of the feedback. This may be a deviation. The SNR/MCS deviation feedback may be fed back (e.g., in an MFBi in an RU based MFB procedure, e.g., as shown in FIG. 10). In this exemplary case, the MFB may be set to the average SINR/MCS. As an example, the MFBi elements may be set to the SNR/MCS deviation. The feedback overhead savings may be as follows:

|  | 20 MHz: 16 RUs | 80 MHz: 37 RUs |
| --- | --- | --- |
| MFB six-bit quantization | 16 × 6 = 96 bits | 37 × 6 = 222 bits |
| Transmission MFB = 6 bits | 1 × 6 + 16 × 2 = | 1 × 6 + 37 × 3 = |
| SNR deviation = 2 bits | 38 bits | 80 bits |
| Transmission MFB = 6 bits | 1 × 6 + 16 × 3 = | 1 × 6 + 37 × 3 = |
| SNR deviation = 3 bits | 54 bits | 117 bits |

The number of bits used in both the average SNR and the SNR deviation feedback may be set, negotiated between AP and STA, and/or set by the STA based on its estimate of the feedback precision needed. The average SNR may be fed back in a common RU feedback field. The RU specific deviations may be fed back in RU or sub-carrier specific fields.

RU labeling compression using source coding may be provided. The size of the RU index fields, e.g., in FIGS. 10 and 11, may be reduced. In an example, an (e.g., each) RU may be identified with a variable length bit-map. Labeling may be based on a type of source coding mechanism, such as Shannon-Fano coding or Huffman coding. Labeling may be made empirically, for example, based on the number of times different RUs may be scheduled. RUs may have a higher probability of being selected based on, for example, the frequency selectivity of the channel causing a local maximum at that RU, the interference from neighboring BSSs causing a local minimum at that RU and inter-BSS interference coordination resulting in an RU having a higher priority than others. RUs having a higher probability of being selected may be labeled with a lower number of bits than other RUs.

An overall feedback may be compressed, for example, due to a lower number of RUs being fed back and/or a limit in the number of bits being used to identify each RU selected.

Compression may be specific to a particular STA or group of STAs or compression may be general to an entire BSS. An AP may be enabled to identify a corresponding RU, for example, by communicating associated labeling between the AP and the STA. An AP may be able to blindly know the length of the bitmap it is decoding. In an example, a maximum number of bits used parameter may be negotiated between the AP and STAs. The parameter may limit the RUs that may be fed back. The labeling may be used for resource allocation.

FIG. 15 is an example of entropy encoding. FIG. 15 shows a 20 MHz RU allocation with its associated resource allocation frequency. Shannon-Fano coding is used to label the RUs with RU labels ranging from 3-bits (e.g., for RUs 6, 1, 8 and 7 that are scheduled with higher frequency) to 9-bits (e.g., for RU 16 that are never scheduled). A reduction from 4-bit signaling over the entire band to 3-bit signaling for RUs 6, 1, 8 and 2 may be implemented, for example, when the AP and STA negotiate and agree on 3-bit signaling. More advanced compression techniques may result in additional savings.

Figures 16, 17:
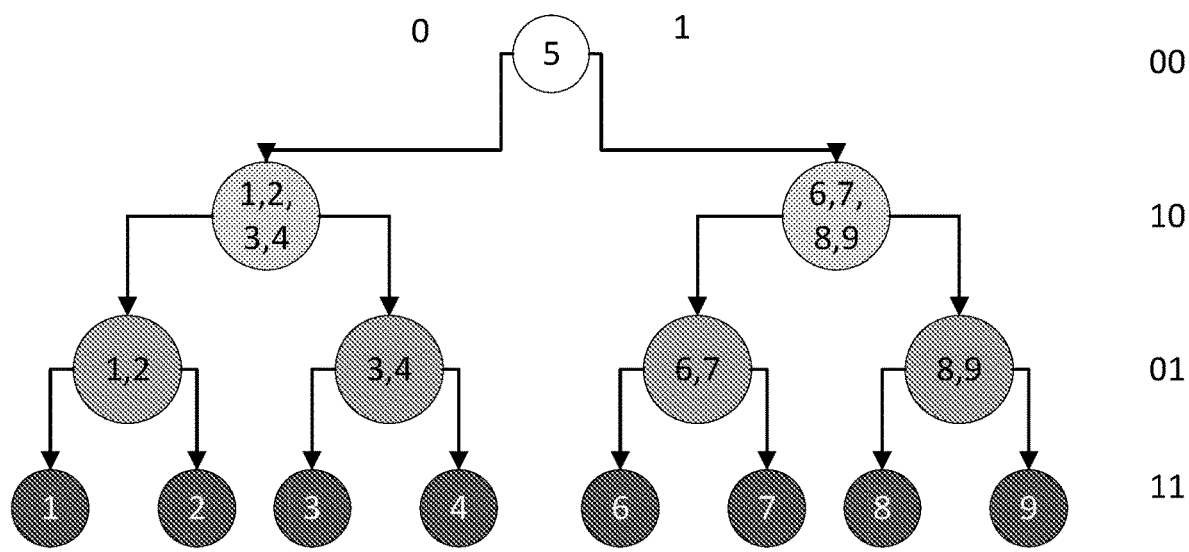
FIG. 16 is an example of simplified RU labeling.
FIG. 17 is an example of a hierarchical RU labeling structure.

FIG. 16 is an example of RU labeling. In a compression technique, the best 8 RUs may be selected for 3-bit signaling, e.g., as shown in the example in FIG. 16.

An RU-label request/report technique may be used to send information between the AP and STAs, for example, when labeling has been determined.

RU labeling compression using hierarchical RU labeling (RU Tree) may be provided. The size of RU index fields in FIGS. 10 and 11 may be reduced. In an example, RUs may be categorized into a hierarchical tree structure separated by layers.

FIG. 17 is an example of a hierarchical RU labeling structure. Sides (e.g., left, right) of a tree structure may be indicated in addition to (e.g., separately from) levels of the tree structure. Sides and levels may be used to reduce the number of bits in feedback.

Feedback of the information for the entire bandwidth may take place in the MFB field, e.g., as shown in FIG. 14, while feedback of the other RUs may take place in the MFBi fields.

Figures 18, 19:
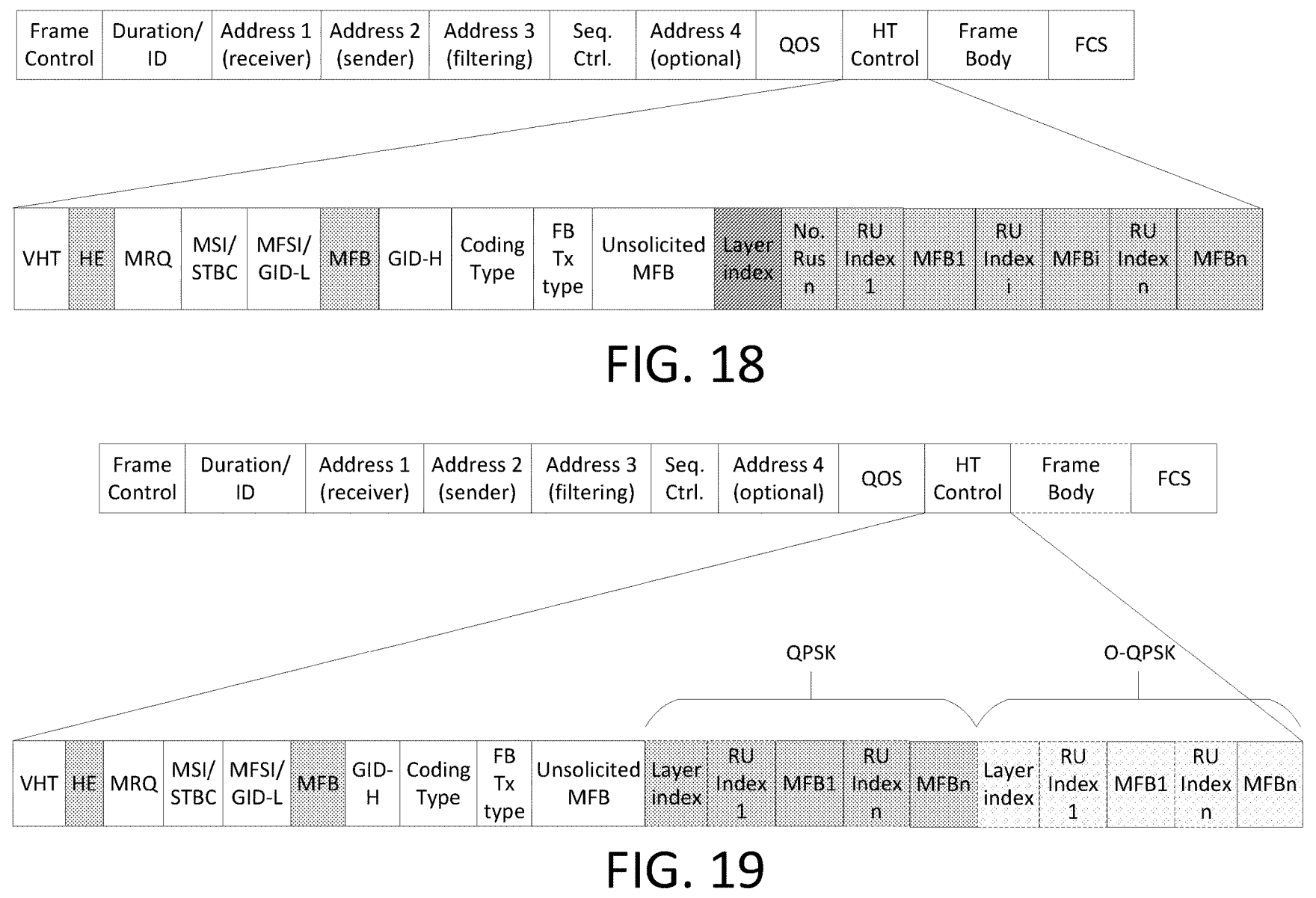

FIG. 18 is an example of hierarchical feedback with a layer restriction. In an example with a layer restriction, feedback (or resource allocation) may be restricted, for example, to a single layer. A single field may be dedicated to the restricted layer, e.g. Layer 11. The size of the RU index field may be sent, for example, based on the number of resources in that layer, e.g., 3-bits for layer 11, two bits for layer 01, 1-bit for layer 10 and zero bits for layer 00.

FIG. 19 is an example of hierarchical feedback without a layer restriction. In an example without a layer restriction, a field may be dedicated to a current layer being fed back. All elements of a current layer may be transmitted consecutively. RU index and MFBi information may be fed back afterwards. The size of the RU index layer may be dependent on the number of elements in the layer. Various techniques may be deployed to distinguish between layers. In a first example, the number of RUs for that layer is signaled. In a second example, the boundaries between layer signaling may be indicated, for example, by changing the modulation type (e.g., from BPSK to rotated BPSK (e.g., 90 degrees) or from QPSK to Offset-QPSK). A receiver may automatically detect a change in layers.

In an example, layer information may be encoded as QPSK or O-QPSK, for example. This may determine whether a label (or resource) is on the 0-sub-tree (left) or 1-sub-tree (right) of a tree. This encoding or other technique to distinguish the side of a tree may reduce the number of bits needed to signal the actual resource label. As an example, resource (3, 4) on layer 01 may be identified by (a) layer 01 sent by QPSK or (b) a 1 bit number.

RU feedback using feedback labeling compression may be provided. Feedback labeling compression may be implemented by STAs and APs. One or more of the following may apply.

An AP may communicate to an STA a maximum number of bits used to identify an RU. A maximum number of bits may be set up, for example, during association of the STA and AP or may be sent by a dedicated MAC frame to the STA.

In an example of an AP directed scheme, an AP may communicate an RU index and its associated label to an STA using an RU label report frame. Labeling may be based on an entropy based compression algorithm, e.g., as shown in FIG. 15. Labeling may be implemented, for example, by selecting the best $2^n$ RUs, where n is the number of bits, e.g., as shown in FIG. 16.

In an example of an STA directed index, an STA may communicate an RU index and associated label to an AP, for example, based on an RU-label request/report procedure. An STA may send an unsolicited RU-label report frame, for example, when there is a change in the labeling suggested by a change in its channel. Labeling may be based on an entropy based compression algorithm, e.g., as shown in FIG. 15. Labeling may be implemented, for example, by selecting the best 2n RUs, where n is the number of bits, e.g., as shown in FIG. 16.

An RU-label request frame may be transmitted from an AP to an STA. A request frame may comprise, for example, a number of bits per label and/or a destination address of the STA.

An RU-label response frame may be transmitted from the STA to the AP unsolicited or in response to an RU label request. An RU-label response frame may be transmitted from the AP to STA(s), for example, in an AP directed system. An RU-label frame may comprise, for example, an address of the STA(s), an actual RU-label, e.g., RU1, RU2, . . . , RU16 or any alternative label indicating an RU and/or a corresponding compressed bitmap indicating a new RU label.

STAs may use an RU-label (alias) during CSI or MCS feedback, for example, to reduce the overhead. An AP may use an RU-label (alias) for resource allocation during an OFDMA transmission.

RU-based CSI feedback may be provided by RU Based CSI feedback capability, RU-based CSI Feedback and/or signaling for RU-based CSI feedback.

RU-based CSI feedback capability may be provided. An HE STA may declare that it is an HE STA, for example, by transmitting an HE Capabilities element. An HE Capabilities element may be carried in a Beacon frame, in association request/response frames, in reassociation request/response frames, in probe request/response frames etc. An HE Capabilities element may comprise an HE capability Information field.

An HE capability Information field may carry subfields, such as one or more of the following subfields.

An OFDMA Beamformer Capable field may indicate support for OFDMA operation as a beamformer.

An OFDMA Beamformee Capable field may indicate support for OFDMA operation as a beamformee.

An OFDMA SU Beamformer Capable field may indicate support for OFDMA operation as an SU beamformer.

An OFDMA SU Beamformee Capable field may indicate support for OFDMA operation as an SU beamformee.

An OFDMA MU-MIMO Beamformer Capable field may indicate support for OFDMA operation as a MU-MIMO beamformer.

An OFDMA MU-MIMO Beamformee Capable field may indicate support for OFDMA operation as a MU-MIMO beamformee.

An RU based immediate CSI feedback capable field may indicate support for RU based immediate CSI feedback.

An RU based delayed CSI feedback capable field may indicate support for RU based delayed CSI feedback.

An RU based immediate and delayed CSI feedback capable field may indicate support for RU based immediate and delayed CSI feedback.

RU-based CSI feedback techniques may be provided. RU based CSI feedback may modify an NDP/NDPA CSI feedback technique.

Figure 20A:
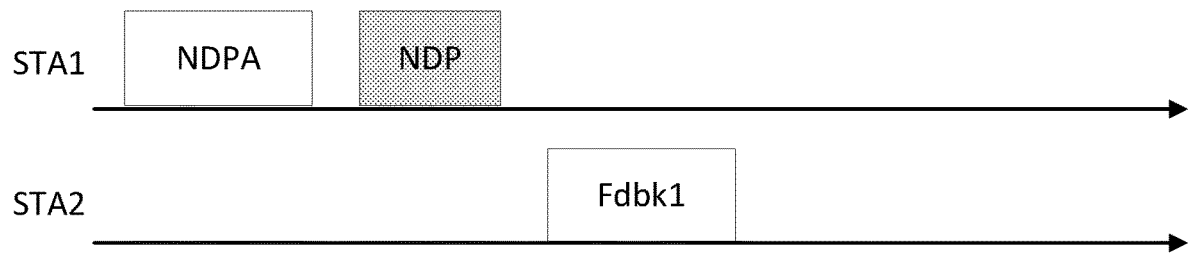
FIGS. 20A and 20B are examples of NDP/NDPA CSI feedback.
Figure 20B:
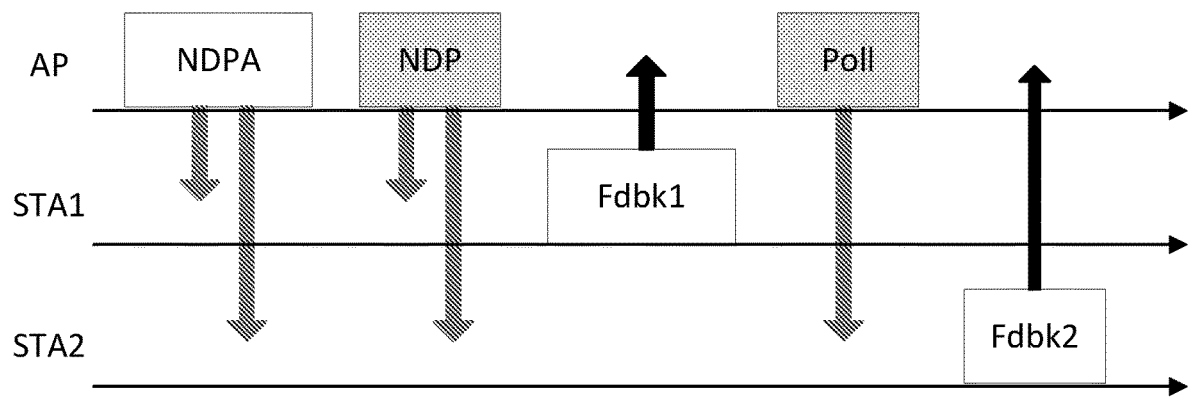

FIGS. 20A and 20B are examples of NDP/NDPA CSI feedback. FIG. 20A shows an example of CSI training and feedback interaction between a transmitter STA and a receiver STA. FIG. 20B shows an example of interaction between a transmitter STA, an AP and multiple receiver STAs. An NDPA frame and CSI feedback frames may be modified.

Single user RU based CSI training and feedback may be implemented, for example, according to the following. STA 1 may acquire the media and transmit an NDPA frame, which may be followed by a NDP frame. STA 1 may indicate the request of RU based CSI feedback and detailed feedback mode, for example, in the NDPA frame. STA 2 may detect the NDPA frame and may prepare the RU based CSI feedback accordingly. STA 2, e.g., based on the feedback mode, may transmit the feedback frame SIFS time after the NDP frame or it may transmit the feedback frame in a delayed mode.

Multiuser RU based CSI training and feedback may be implemented, for example, according to one or more of the following. An AP may acquire the media and may transmit an NDPA frame to a group of STAs, which may be followed by a NDP frame. The AP may indicate the request of RU based CSI feedback and detailed feedback mode, for example, in the NDPA frame. STAs may detect the NDPA frame and may prepare the RU based CSI feedback accordingly. According to the feedback mode, the STAs, e.g., based on the feedback mode, may transmit the feedback frame immediately after the NDP frame or may transmit the feedback frame in a delayed mode.

RU-based CSI feedback signaling may be provided. An NDPA frame may be modified to announce RU-based CSI training.

Figure 21:
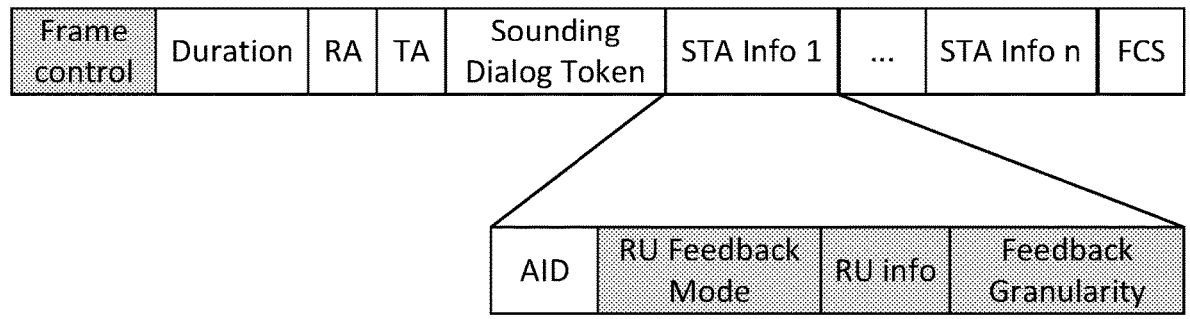
FIG. 21 is an example of a modified NDPA frame.

FIG. 21 is an example of a modified NDPA frame. One or more of the following may apply.

A frame control field may be modified to indicate RU based CSI training. A STA Information field may comprise a variety of information about one or more STAs. A STA Information field may comprise one or more subfields indicating one or more of the following information about each STA.

An AID field may be used to carry STA ID. An ID may be AID, a compressed version of AID, a partial AID (PAID), etc.

An RU Feedback mode field may, for example, carry one or combinations of the following feedback modes.

A first mode (e.g., Mode 1) may indicate a driver of the feedback. A transmitter specified RU feedback mode may indicate that the transmitter of the NDPA frame may specify the RU(s) for CSI feedback. A receiver specified RU feedback mode may indicate the receiver of the NDPA frame or an STA specified by the AID field may decide to feedback CSI on certain RUs.

A second mode (e.g., Mode 2) may indicate timing of feedback. An immediate RU feedback mode field may be used to indicate that an STA may feedback CSI information immediately after receiving the NDPA/NDP frames. A delayed feedback mode field may be used to indicate that a STA may feedback the CSI information after a delay, e.g., when it is ready.

A third mode (e.g., Mode 3) may indicate an MU feedback mechanism. In an example where more than one STA may be involved in the NDPA/NDP exchanges, the STAs may feedback the RU based CSI using a variety of techniques, e.g., time domain, RU domain or spatial domain. In an example of a time domain technique, the STAs may feedback the CSI sequentially in the time domain. An STA may or may not be polled before it may feedback the CSI. In an example of an RU domain technique, STAs may feedback the CSI using different RUs. The RUs utilized to carry the CSI information may or may not be the same as RUs the STA measured the CSI on. In an example of a spatial domain technique, STAs may feedback the CSI using multiple antennas with spatial domain division.

A fourth mode (e.g., Mode 4) may indicate the contents, type or state of feedback. Contents, type or state of feedback may comprise, for example, compressed feedback, uncompressed feedback and codebook based Feedback.

A fifth mode (e.g., Mode 5) may indicate, for example, independent feedback or differential feedback.

An RU information field may be used to signal the RUs for which the CSI feedback is provided. An RU information field may be represented in a bitmap format or by an RU index. In the bitmap format, a K-bit array may be used to identify each RU, for example when a maximum K RUs are allowed. Alternatively, an RU index may be defined as a specific label that identifies a particular RU or group of RUs. As an example, an RU index 10 may indicate RU 1 and RU 2.

A feedback granularity field may indicate feedback granularity, e.g., per STA, per RU. A feedback granularity field may be carried in each STA Information field, such that each STA may use its own granularity. Each STA may be set to a BSS wide feedback granularity. In an example, a feedback granularity field may be carried in an RU information field, such that each RU may use one set of granularity. Feedback granularity may depend on a feedback mode. Some examples follow.

RU-based CSI feedback may indicate, for example, 4/5/6/8-bit real/imaginary CSI values requested for specific RU/RU band. In this mode, the actual CSI is used and as such, may allow for better interpolation between feedback subcarriers. This may allow the feedback granularity to be lower, e.g., feed back less subcarriers to be able to estimate the channel for each RU.

RU-based non-compressed beamforming weights may indicate, for example, 8/6/4/2-bit real/imaginary values plus SNR value for each STS. In this mode, the feedback granularity may need to be higher than in the RU-based CSI feedback. As it may be uncompressed, there may be a trade-off between the granularity and the overhead.

RU-based compressed beamforming weights may indicate, for example, 1/2/3/4-bit quantized angular values plus average SNR for each stream. In this case, the feedback granularity may be higher without the attendant increase in overhead.

Figure 22:
FIG. 22 is an example of a unified CSI feedback frame.

FIG. 22 is an example of a unified CSI feedback frame. An NDPA frame for RU based CSI feedback mechanism may be used and modified. The description above may be applied to other type of control frames or some fields (e.g., STA information may be signaled in SIG-A/B fields in PLCP header). A unified CSI feedback frame may be utilized by an STA to feedback RU-based CSI. A unified CSI feedback frame may implemented, for example, by modifying a compressed beamforming report frame. A unified CSI feedback frame may carry, for example, at least three fields: (i) an MU Control field, (ii) an MU CSI report field, and (iii) an MU SINR report field, for example, as shown in FIG. 22.

Figure 23:
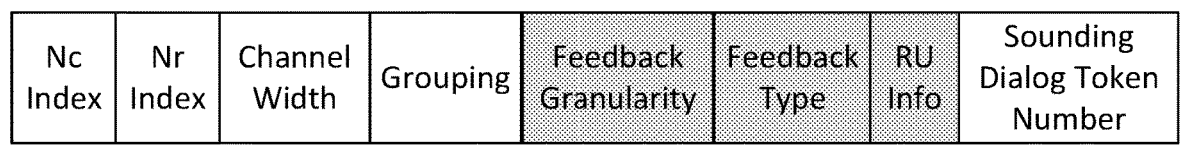
FIG. 23 is an example of an MU control field.

FIG. 23 is an example of an MU control field. An MU Control field may be designed and/or implemented, for example, as shown in FIG. 23, where one or more of the following may apply.

A noise criterion ("NC") Index and noise ratio ("Nr") Index may be used to indicate the size of CSI matrices.

A Channel Width field may be used to indicate the channel measured to create the CSI feedback matrix. Note, with different channel width, a set of RU indices may be fed back and may correspond to a specified channel width.

A Grouping field may indicate the grouping of subcarriers, e.g., Ng.

A Feedback Granularity field may indicate the granularity of feedback.

A Feedback Type field may indicate one or more RU feedback modes described in an NDPA frame.

An RU Information field may indicate the indices of RUs in which the frame carry their CSI. RU based CSI information may be fed back in more than one unified CSI feedback frame.

A Sounding Dialog Token Number field may be used to solicit feedback of an NDPA frame.

Figure 24:
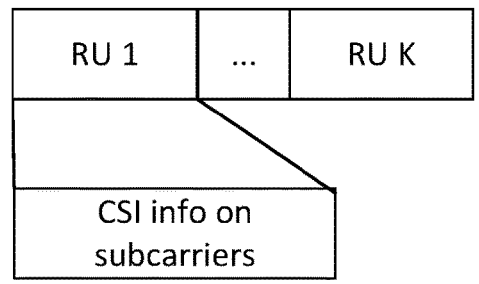
FIG. 24 is an example of an MU CSI report field.

FIG. 24 is an example of an MU CSI report field. An MU CSI report field may be used to carry (e.g., explicit) CSI feedback in corresponding RUs identified in an MU control field, for example, as shown in FIG. 24. The RU k field may carry compressed beamforming report on the kth RU. The report may include an average SNR per RU per stream.

The report may contain CSI information on for example the specified subcarriers. The CSI information may be compressed CSI information. For example, angles compressed from channel matrix or V matrix using Givens rotation may be utilized.

The report may contain a differential CSI information. The CSI information may include average SNR and/or CSI information (e.g., on the specified subcarriers). The CSI information may be time main or frequency domain differential information.

Time domain differential CSI information may be used. The report may use a past report as a reference. A deviation value compared with the reference report may be used. The deviation value may be used instead of reporting the absolute values of the compressed or uncompressed CSI information. Each BF report may carry a token. The token may be used to identify the report uniquely (e.g., in a time period). The token of the reference CSI report may be included explicitly, for example, when a time domain differential CSI report is utilized. A difference of time stamp of the current CSI report and reference CSI report may be signaled.

Frequency domain differential information may be used. The report may use a subcarrier as reference. The CSI information on the rest of subcarriers may be the deviation comparing with the reference subcarrier. The reference subcarrier may be specified, signaled in the sounding and/or report frame, or implementation dependent.

Figure 25:
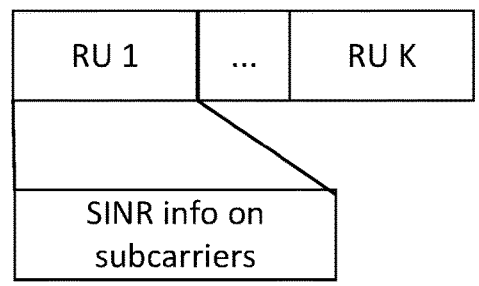
FIG. 25 is an example of an MU SINR report field.

FIG. 25 is an example of an MU SINR report field. An MU SINR report field may be used to carry SINR measurement in corresponding RUs identified in an MU control field, for example, as shown in FIG. 25. An SINR report may be average SINR on an RU or detailed SINR per sub-carrier or for a group of sub-carriers. Granularity may be defined in the MU Control field.

A subcarrier group SNR deviation report may be fed back (e.g., on a per RU or per-subcarrier group basis). The deviation in dB of the SNR of each subcarrier or group of subcarriers from the average SNR across the RU (or group of subcarriers) may be fed back to the beamformer. The HE-SIG-B field of the feedback frame may hold common and/or RU specific information on the RUs being fed back (e.g., both the CSI feedback information and the subcarrier SNR deviation report). A defined subset of subcarriers (e.g., not tied to a specific RU) may be fed back. The CSI request frame (e.g., the NDP frame) may specify the index of the start sub-carrier and/or the end sub-carrier for feedback. This may allow the use of CSI feedback for different transmission bandwidths (e.g., as the subcarriers for different transmission bandwidths may not overlap).

Unified Feedback may be used. This may include one or more of the following. An AP may send an NDP announcement to specific STAs or a group of stations. The AP may send an NDP to specific STAs. The NDP may have a preamble without data to enable stations to measure the channel based on the parameters sent in the NDPA announcement. An NDPA frame may include a resource unit channel quality feedback request for each resource unit within a bandwidth on a station basis (e.g., one or more resource units for each station). An NDP Announcement frame may signal/indicate a resource unit channel quality feedback request for at least one resource unit within a first bandwidth for each or all station(s). The NDPA may request all stations to respond with the same resource units or request that each station send back information on different resource units. The AP may request certain RUs and/or subcarriers (e.g., start subcarrier and end sub-carrier) for feedback (e.g., in an NDPA frame). Each STA may send CSI feedback to the AP and may use a feedback frame for sending the CSI feedback. The STA may use the HE-SIG-B or the actual feedback frame to indicate the start and/or end sub-carriers RUs that the information being fed back represents. The feedback MAC frame may include one or more of the following fields—Category: Set to HE, HE Action: Set to HE Feedback, or MU HE Control Field. One or more of the following may apply relating to the MU HE Control Field. The MU HE Control Field may be set up as described above. A 2-bit field may specify the actual type of feedback. For example, for 00: SINR/MCS: the SINR may be combined with a recommended MCS and a recommended number of Space Time Streams. The SINR/MCS may be signaled back independently for each RU (or group of sub-carriers) or an average SINR/MCS may be signaled back (e.g., with an SINR/MCS deviation for each group of sub-carriers). For 01: SINR+Channel State Information/beamforming information, the SINR per stream may be combined with information about the channel. The information may be the actual channel coefficients or compressed/non-compressed beamforming information. For 10: SINR+CSI+MU exclusive information, the information in type 01 may be combined with the deviation in SNR/MCS of each sub-carrier that is fed back (e.g., based on specific RU or range of sub-carriers). The order in which the CSO information is fed back may be based on the RU allocation or sub-carriers specified in the HE-SIG-B field or feedback frame. The 11 field may be reserved.

The feedback mode may determine the granularity and amount of feedback a STA (e.g., each STA) sends to the AP. Example feedback modes may include one or more of the following. Feedback information for all RUs: 1 through 16, Feedback information for a specific RU: 1, 2, . . . , 16, Feedback information for a specific group of subcarriers (e.g., This group of sub-carriers may span multiple RUs), Feedback information for RUs of a specific type (e.g., a STA may feedback RUs of a certain size only indicating to the AP that it prefers allocations of that size, e.g. RU size of 104 subcarriers, e.g., [RU14, RU15], RU size of 52 subcarriers, e.g., [RU10, RU11, RU12, RU13]), Feedback information for the N-top RUs (e.g., the best-N bands may be fed back from each STA and the number of bands may be specified by the AP or independently decided on by each STA, e.g., determined by Access categories and buffer occupancy (e.g., in uplink)), and/or Feedback information may be based on a desired feedback compression mode.

Multi-stage RU-based feedback may be used. The amount of feedback needed to enable Single User Multiple Input Multiple Output Orthogonal Frequency Division Multiple Access (SU MIMO OFDMA) beamforming or Multiple User MIMO OFDMA beamforming may be reduced. The AP may identify a desired band/RU based on a first stage feedback (e.g., SNR or MCS Feedback). The AP may request a second stage full CSI feedback for specific RU(s) or bands of interest. One or more of the following may be performed.

The AP may send an NDP announcement. The AP may send an NDP. The NDP may enable the STAs to estimate their downlink channels.

The AP may send out a stage 1 CSI request or trigger frame. The trigger frame may request limited CSI information (e.g., a non-MIMO or scalar value). This may enable the AP at a future time to request more detailed information on a specific sub-set of subcarriers. The sub-carrier set may be based on a resource unit (RU) granularity or a signaled sub-carrier range. The feedback request may indicate a request for RU(s), e.g., all the RUs, the best N RUs, or best sub-carrier ranges. The feedback request may be a scheduled trigger frame. In the scheduled trigger frame, the AP may request information from a specific STA. The feedback request may be a random access trigger frame. For a random access trigger frame, each STA may randomly accesses the UL multi-user resources. The feedback request may be random access and/or scheduled resources. When scheduling the response, the access point may allocate one or more resource units for each station to provide data.

STA(s) may send responses to the APs stage 1 CSI feedback request. The feedback may be a scheduled or random access uplink multi-user (UL-MU) transmission. The feedback may be scheduled by an UL-MU trigger frame or may be sent by each STA autonomously in response to an uplink random access trigger frame. Feedback may be a non-MIMO CSI feedback that may include an average of SNR of space time streams based on rank and/or channel condition number, total SNR of space time streams, and/or a resource unit based MCS Feedback (MFB) SNR.

The AP may send out multiple scheduled or random access triggers to the STAs. These triggers may ensure that STAs (e.g., all STAs) send back their Stage 1 CSI feedback. This information may be small and the overhead may be lower compared with full CSI feedback.

An AP scheduler may decide on the STA(s) and band of interest or RUs that it desires.

Figure 28:
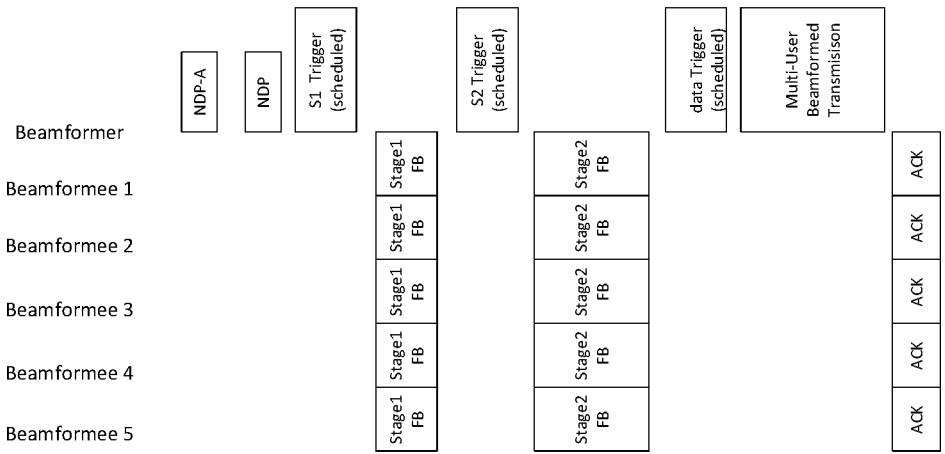
FIG. 28 is an example of multi-stage CSI feedback with scheduled stage 1/2 trigger frames and explicit downlink data trigger frame.

The AP may send a stage 2 CSI trigger to the STAs (e.g., for the specific band of interest). On receiving the CSI, a data transmission trigger frame for DL beamformed transmission may be sent, e.g., as shown in FIG. 28. FIG. 28 is an example of Multi-Stage CSI feedback with scheduled stage 1/2 trigger frames and explicit downlink data trigger frame. A STA may reply with UL MU CSI feedback (e.g., for the specific band) using one of more of the following. The feedback may be based on time or frequency domain differential feedback. The feedback may use scalar difference or vector difference (e.g., based on mapping adjacent sub-carriers in time/frequency to the range/null space of the base subcarrier). Quantization levels for the feedback may be specified differently for each user or each $(\varphi_i, \psi_i)$ for a specific user. The AP may specify long term, short term, and/or instantaneous feedback from a specific user. The AP may use the CSI to transmit a multiuser beamformed signal to the STA(s) of interest. The transmission serves as an ACK to the stage 2 CSI feedback.

Figure 27:
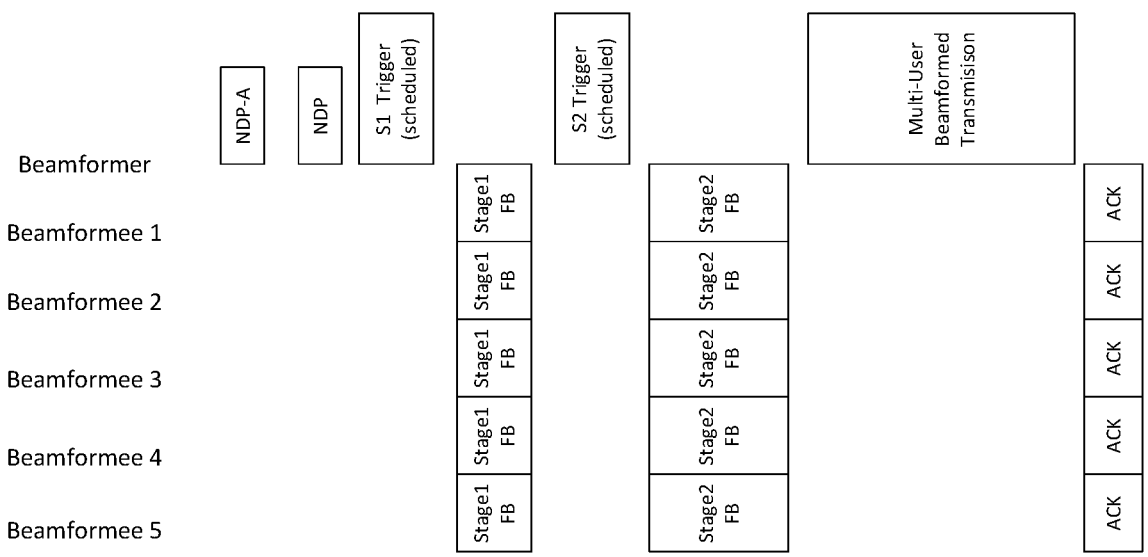
FIG. 27 is an example of Multi-Stage CSI feedback with scheduled stage 1/2 trigger frames and no explicit downlink data trigger frame.
Figure 29:
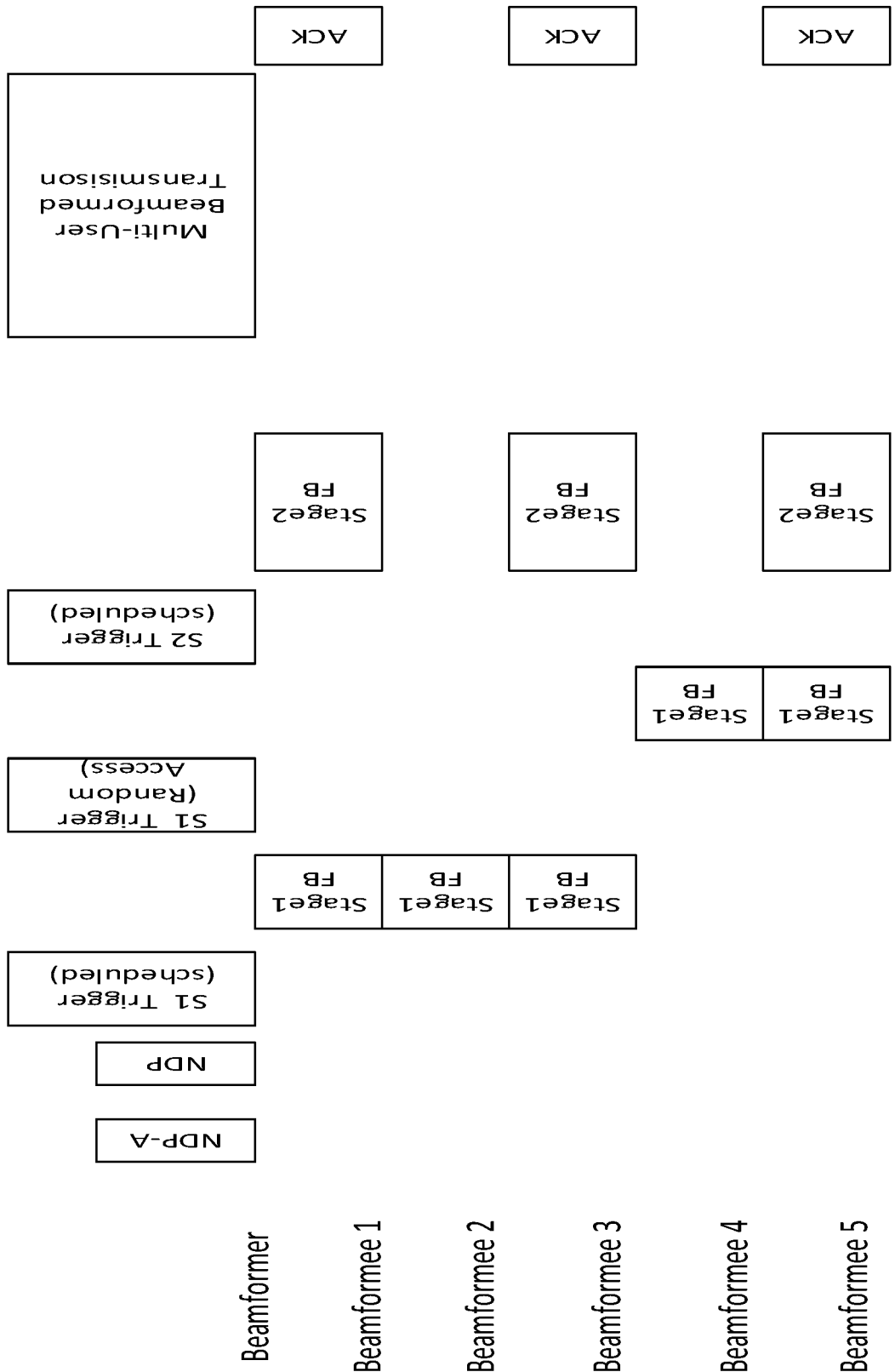
FIG. 29 is an example of multi-stage CSI feedback with scheduled and random access stage 1 and 2 trigger frames and no explicit downlink data trigger frame.

The AP may combine the user scheduling frame and stage 2 CSI feedback frame, e.g., as shown in FIGS. 27 and 29. FIG. 27 is an example of multi-stage CSI feedback with scheduled stage 1/2 trigger frames and no explicit downlink data trigger frame. FIG. 29 is an example of multi-stage CSI feedback with scheduled and random access stage 1 and 2 trigger frames and no explicit downlink data trigger frame. The STA may reply with the stage 2 CSI feedback. The AP may send a multi-user beamformed signal to the STAs. The feedback may be similar to that discussed above.

The STAs may send an ACK to the AP.

Figure 30:
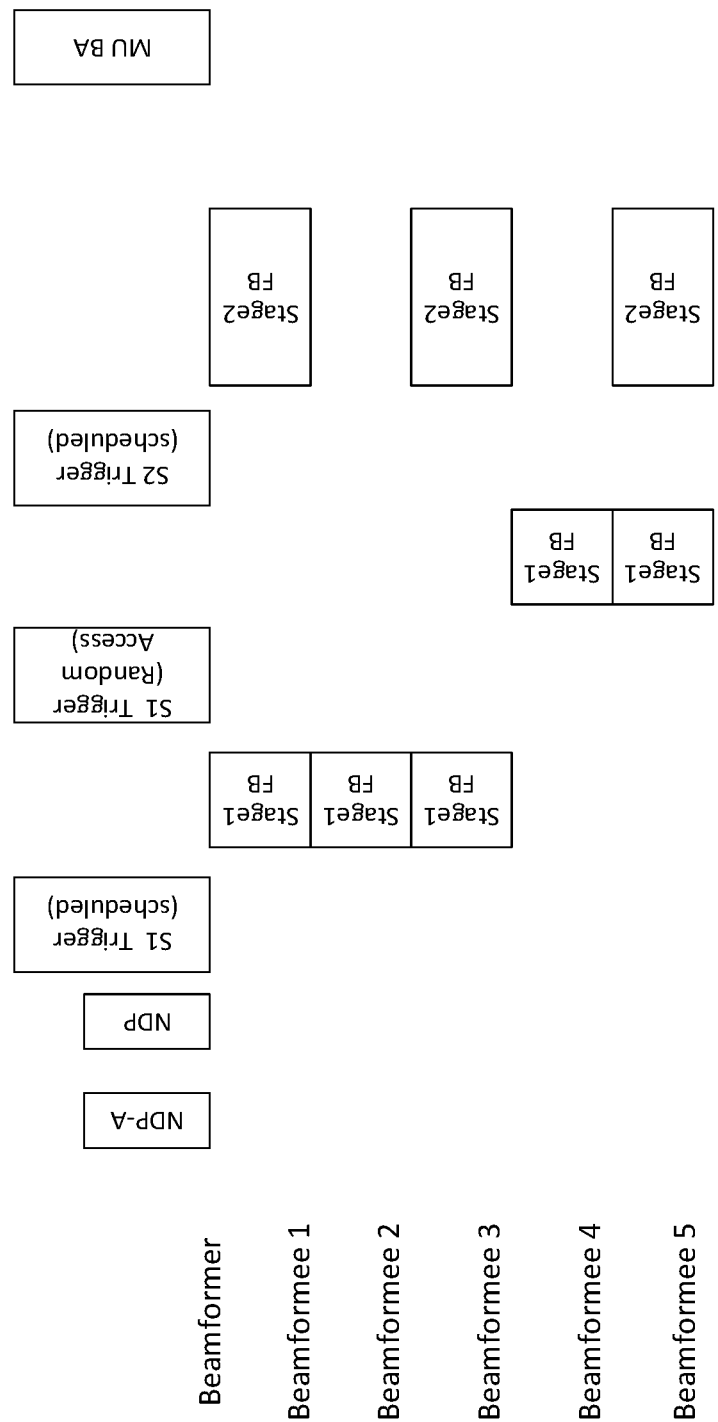
FIG. 30 is an example of multi-stage CSI feedback with scheduled and random access stage 1 and 2 trigger frames with no downlink data transmission.

The AP may request multiple stage 2 feedback from the STAs without sending a beamformed transmission to the STAs. The stage 2 feedback may be requested by a random access trigger frame. The AP may reply with an ACK after the stage 2 CSI feedback, as shown in FIG. 30. FIG. 30 is an example of Multi-Stage CSI feedback with scheduled and random access stage 1 and 2 trigger frames with no downlink data transmission. The terms stage 1 and stage 2 feedback are conceptual and may be substituted by other terminology. Using multi-stage RU based CSI feedback may result in a savings of up to 90% over full band feedback as shown in FIG. 31. The AP request to each of the stations to send channel information based on the feedback response may be sent in the same bandwidth as the NDP, a bandwidth that is a subset of the NDP bandwidth, or a bandwidth that is different than the NDP bandwidth.

Feedback with symmetric RU allocation may be provided. Limitations may be applied to RU allocation rules, for example, to limit some or all RU allocation to symmetric RU allocations.

Figure 26:
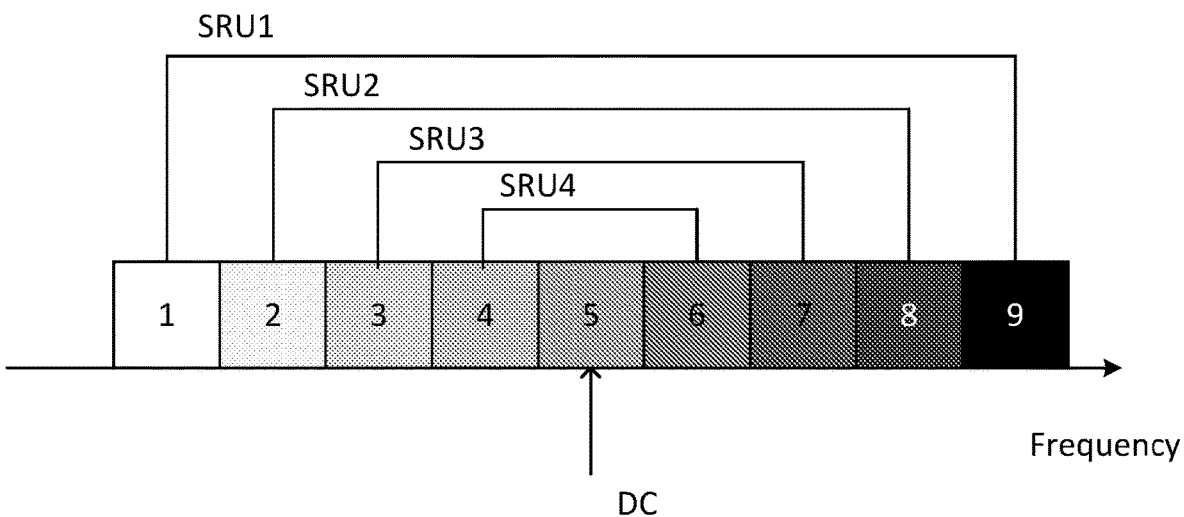
FIG. 26 is an example of symmetric RU allocation.

FIG. 26 is an example of symmetric RU allocation. In an example shown in FIG. 26, RU1 may be (e.g., always) paired with RU 9 for symmetric RU allocation.

Symmetric RU1 (SRU1) may be used to indicate, for example, RU1 and RU9, e.g., SRU1=[RU1, RU9]. Similarly, SRU2=[RU2, RU8]; SRU3=[RU3, RU7]; SRU4=[RU4, RU6]. A feedback request may indicate symmetric RU allocation, for example, by using SRU indices instead of RU indices in a feedback request. SRU indices may be utilized, for example, when symmetric RU allocation is specified in a feedback report frame. Symmetric RU allocation may limit the effect of interference caused by imbalance. Feedback information (e.g., CSI or MCS) may represent those on two paired RUs (e.g. simple average or weighted average). Other disclosed technologies (e.g., RU-based MCS Feedback and RU based CSI feedback) may be applied to symmetric RU allocation. Overhead associated with RU allocation (e.g., RU index) may be reduced, e.g., nearly in half, for symmetric RU allocation.

An L_LENGTH calculation may be used and may be as follows:
With $$TXTIME = T_{L\_PREAMBLE} + T_{HE\_PREAMBLE} + T_{HE\_DATA} + T_{PE}$$

$$T_{HE\_DATA} = T_{HE\_SYM} \times N_{SYM} = (12.8 + T_{GI}) \times N_{SYM}$$

$T_{PE}$ is the PE duration.
For a STA operating in 5 GHz band, L_LENGTH field in L-SIG is set by:

$$L_{LENGTH} = ((TXTIME-20)/4) \times 3 - 3 - m, m=1 \text{ or } 2$$

or alternatively, $$L_{LENGTH} = ((TXTIME-20)/4) \times 3 - 6 + m, m=1 \text{ or } 2$$

For a STA operating in 2.4 GHz band, L_LENGTH field in L-SIG is set by:

$$L_{LENGTH} = ((TXTIME-20-SignalExtention)/4) \times 3 - 3 - m, m=1 \text{ or } 2$$

Where SignalExtension is 6 (us)
Or, $$L_{LENGTH} = ((TXTIME-20-SignalExtention)/4) \times 3 - 6 + m, m=1 \text{ or } 2.$$

The systems, methods, and instrumentalities described herein may apply in any combination, may apply to other wireless technologies, and for other services.

Although disclosed features, elements and techniques (e.g. disclosed technologies) are described in various examples with various combinations, each feature, element or technique may be implemented alone and in various combinations with and without other described features, elements and techniques.

Although examples are presented with respect to 802.11, the disclosed technologies are applicable to other wireless systems and protocols.

Although examples are presented with Short Inter Frame Space (SIFS) to indicate various inter frame spacing, the disclosed technologies may be applied with other inter frame spacing, such as Reduced Inter Frame Space (RIFS) or other agreed time intervals.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method performed by an access point (AP), the method comprising:
    transmitting, in a wireless local area network (WLAN), a null data packet announcement (NDPA), the NDPA comprising a first STA information field and a second STA information field, the first STA information field comprising:
        a first AID subfield configured to include a first STA identifier (ID) identifying a first STA, and
        at least a first resource unit (RU) index for the first STA that indicates a first group of RUs comprising a first group of subcarriers associated with channel state feedback, wherein the first group of RUs for the first STA is less than a 20 megahertz (MHz) channel bandwidth,
    and the second STA information field comprising:
        a second AID subfield configured to include a second STA ID identifying a second STA, and
        at least a second RU index for the second STA that indicates a second group of RUs comprising a second group of subcarriers associated with channel state feedback, wherein the second group of subcarriers is different than the first group of subcarriers, and wherein the second group of RUs for the second STA is less than a 20 MHz channel bandwidth;
    transmitting a null data packet (NDP) for measurement of a channel quality;
    receiving a first feedback response, the first feedback response including per-RU feedback for the first group of RUs comprising the first group of subcarriers;
    receiving a second feedback response, the second feedback response including per-RU feedback for the second group of RUs comprising the second group of subcarriers;
    transmitting a feedback request for a compressed beamforming wherein the compressed beamforming report is associated with a subset of RUs of the first group of RUs for which the first feedback response was transmitted; and
    receiving a third feedback response including the compressed beamforming report.

2. The method of claim 1, wherein the indication of the channel quality is in terms of a signal to noise ratio (SNR).

3. The method of claim 1, wherein the first feedback response comprises a per-RU average SNR of each space time stream associated with the group of RUs.

4. An access point (AP) comprising:
    a transceiver configured to transmit, in a wireless local area network (WLAN), a null data packet announcement (NDPA), the NDPA comprising a first STA information field and a second STA information field, the first STA information field comprising:

a AID subfield configured to include a first STA identifier (ID) identifying a first STA, and
at least a first resource unit (RU) index for the first STA that indicates a first group of RUs comprising a first group of subcarriers associated with channel state feedback, wherein the first group of RUs for the first STA is less than a 20 megahertz (MHz) channel bandwidth, and the second STA information field comprising:
a second AID subfield configured to include a second STA ID identifying a second STA, and
at least a second RU index for the second STA that indicates a second group of RUs comprising a second group of subcarriers associated with channel state feedback, wherein the second group of subcarriers is different than the first group of subcarriers, and wherein the second group of RUs for the second STA is less than a 20 MHz channel bandwidth;
the transceiver further configured to transmit a null data packet (NDP) for measurement of a channel quality;
the transceiver further configured to receive a first feedback response, the first feedback response including per-RU feedback for the first group of RUs comprising the first group of subcarriers;
receiving a second feedback response, the second feedback response including per-RU feedback for the second group of RUs comprising the second group of subcarriers;
the transceiver further configured to transmit a feedback request for a compressed beamforming report, wherein the compressed beamforming report is associated with a subset of RUs of the firsts group of RUs for which the first feedback response was transmitted; and
the transceiver further configured to receive a third feedback response including the compressed beamforming report.

5. The AP of claim 4, wherein the indication of the channel quality is in terms of a signal to noise ratio (SNR).

6. The AP of claim 4, further comprising:
the transceiver further configured to transmit a trigger frame which specifies resources for transmission of the first feedback response, wherein the trigger frame is sent to a plurality of stations.

7. The AP of claim 4, wherein the first feedback response comprises a per-RU average SNR of each space time stream associated with the group of RUs.

8. A station (STA) comprising:
a transceiver configured to receive a null data packet announcement (NDPA), the NDPA comprising a first STA information field and a second STA information field,
the first STA information field comprising:
a first AID subfield configured to include a first STA identifier (ID) identifying a first STA, and
at least a first resource unit (RU) index for the first STA that indicates a first group of RUs comprising a first group of subcarriers associated with channel state feedback, wherein the first group of RUs for the first STA is less than a 20 megahertz (MHz) channel bandwidth;
and the second STA information field comprising:
a second AID subfield configured to include a second STA ID identifying a second STA, and
at least a second RU index for the second STA that indicates a second group of RUs comprising a second group of subcarriers associated with channel state feedback, wherein the second group of subcarriers is different than the first group of subcarriers, and wherein the second group of RUs for the second STA is less than a 20 MHz channel bandwidth;
the transceiver further configured to receive a null data packet (NDP) for measurement of a channel quality;
a processor configured to:
determine, from the first STA information field, to provide the channel state feedback; and
the transceiver further configured to transmit a first feedback response, the first feedback response comprising per-RU feedback for the first group of RUs comprising the first group of subcarriers;
the transceiver further configured to receive a feedback request for a compressed beamforming report; and
the transceiver further configured to transmit a second feedback response including the compressed beamforming report, wherein the compressed beamforming report is associated with a subset of RUs of the first group of RUs for which the first feedback response was transmitted.

9. The station of claim 8, wherein the indication of the channel quality is in terms of a signal to noise ratio (SNR).

10. The station of claim 8, wherein a resource unit is a collection of resources that consist of time and frequency allocations.

11. The station of claim 8, further comprising:
the transceiver further configured to receive a trigger frame which specifies resources for transmission of the first feedback response, wherein the trigger frame is configured for a plurality of stations including the station.

12. The station of claim 11, wherein the transceiver is configured to transmit the second feedback response simultaneously with feedback responses transmitted by other stations of the plurality of stations.

13. The station of claim 8, wherein the second feedback response includes feedback information of a resource unit for which feedback was provided in the first feedback response.

14. The station of claim 8, wherein the first feedback response comprises a per-RU average SNR of each space time stream associated with the group of RUs.

15. A method performed by a station (STA), the method comprising:
receiving a null data packet announcement (NDPA), the NDPA comprising a first STA information field and a second STA information field,
the first STA information field comprising:
a first AID subfield configured to include a first STA identifier (ID) identifying a first STA, and
at least a first resource unit (RU) index for the first STA that indicates a first group of RUs comprising a first group of subcarriers associated with channel state feedback, wherein the first group of RUs for the first STA is less than a 20 megahertz (MHz) channel bandwidth;
and the second STA information field comprising:
a second AID subfield configured to include a second STA ID identifying a second STA, and
at least a second RU index for the second STA that indicates a second group of RUs comprising a second group of subcarriers associated with channel state feedback, wherein the second group of subcarriers is different than the first group of subcarriers, and wherein the second group of RUs for the second STA is less than a 20 MHz channel;
receiving a null data packet (NDP) for measurement of a channel quality bandwidth;

determining, based on the first STA information field, to provide the channel state feedback;

transmitting a first feedback response, the first feedback response comprising per-RU feedback for the first group of RUs comprising the first group of subcarriers;

receiving a feedback request for a compressed beamforming report; and transmitting a second feedback response including the compressed beamforming report, wherein the compressed beamforming report is associated with a subset of RUs of the first group of RUs for which the first feedback response was transmitted.

16. The method of claim 15, wherein the indication of the channel quality comprises a signal to noise ratio (SNR).

17. The method of claim 15, further comprising:
receiving a trigger frame which specifies resources for transmission of the first feedback response.

18. The method of claim 15, wherein the second feedback response includes feedback information of a resource unit for which feedback was provided in the first feedback response.

19. The method of claim 15, wherein the first feedback response comprises a per-RU average SNR of each space time stream associated with the group of RUs.

* * * * *